(12) United States Patent
Thaniyavarn

(10) Patent No.: US 6,842,569 B2
(45) Date of Patent: Jan. 11, 2005

(54) POLARIZATION INDEPENDENT BROAD WAVELENGTH BAND OPTICAL SWITCHES/MODULATORS

(75) Inventor: Suwat Thaniyavarn, Bellevue, WA (US)

(73) Assignee: Eospace, Inc., Redmond, WA (US)

( * ) Notice: Subject to any disclaimer, the term of this patent is extended or adjusted under 35 U.S.C. 154(b) by 331 days.

(21) Appl. No.: 09/858,914

(22) Filed: May 17, 2001

(65) Prior Publication Data

US 2002/0025103 A1 Feb. 28, 2002

Related U.S. Application Data

(60) Provisional application No. 60/204,774, filed on May 17, 2000, and provisional application No. 60/204,775, filed on May 17, 2000.

(51) Int. Cl.[7] .................................................. G02B 6/26
(52) U.S. Cl. .......................................... 385/41; 385/16
(58) Field of Search ............................... 385/41, 42, 2, 385/3, 16

(56) References Cited

U.S. PATENT DOCUMENTS

| 4,142,775 A | | 3/1979 | Ramaswamy et al. |
| 4,679,893 A | | 7/1987 | Ramer |
| 4,763,974 A | * | 8/1988 | Thaniyavarn ................... 385/3 |
| 5,202,941 A | | 4/1993 | Granestrand ................. 385/41 |
| 5,375,180 A | * | 12/1994 | Murphy ....................... 385/21 |

* cited by examiner

Primary Examiner—John D. Lee
Assistant Examiner—Mike Stahl
(74) Attorney, Agent, or Firm—Fleshner & Kim LLP

(57) ABSTRACT

Optical switches based on the balanced bridge interferometer design require precisely made (or half a coupling length) directional couplers to achieve minimum crosstalk for the two switch outputs. Precision 3 dB-directional couplers require the waveguide dimensions and fabrication parameters of the evanescent region to be tightly controlled making a low crosstalk switch difficult to manufacture and expensive. A new type of balanced bridge interferometer type switch is disclosed where the input and output directional couplers are asymmetrically biased to induce a certain difference in the propagation constants between the two waveguide in the directional couplers. By using the asymmetrically biased directional couplers with a certain tuning a bias voltage for the directional couplers. Low crosstalk switches can be achieved for a very wide range of directional coupler strengths, relaxing the precise half-coupling length directional couplers required in conventional design. This relaxation of the precise directional coupler waveguide regions allows a relaxation in the manufacturing tolerance of the devices and therefore make the switch much easier to make. Because low crosstalk switches can be a device with an extended operating range and broader directional coupler parameters, switches can be used for a much broader wavelength bandwidth. In one of the embodiments, this new design allows a device to switch both TE and TM mode optical signals simultaneously at low crosstalk levels to result in a polarization-independent optical switch.

79 Claims, 17 Drawing Sheets

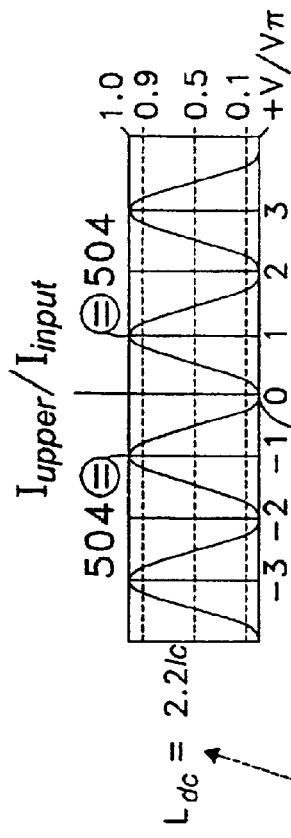
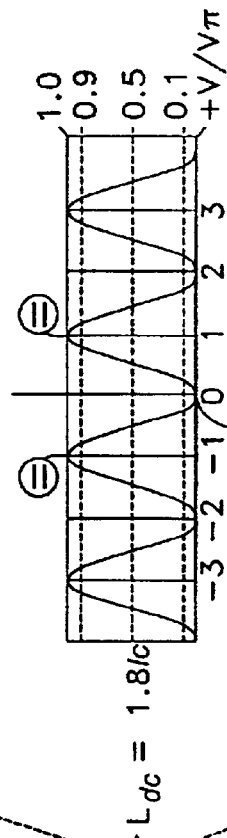
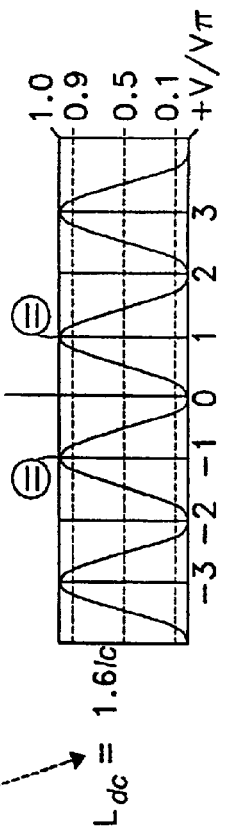
FIG. 5A
FIG. 5B
FIG. 5C
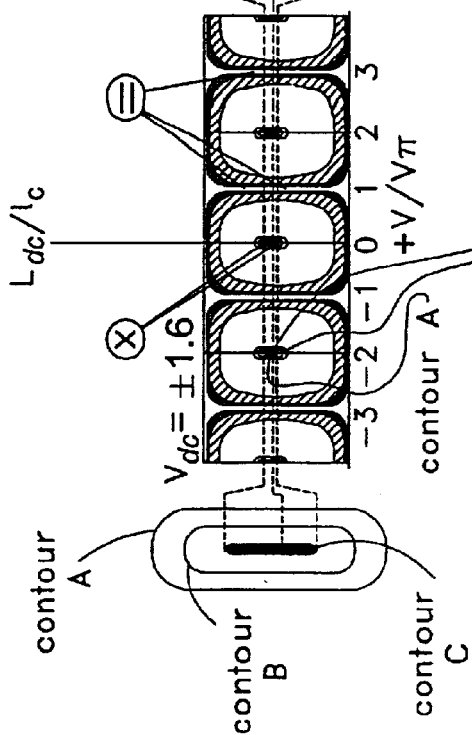
FIG. 4

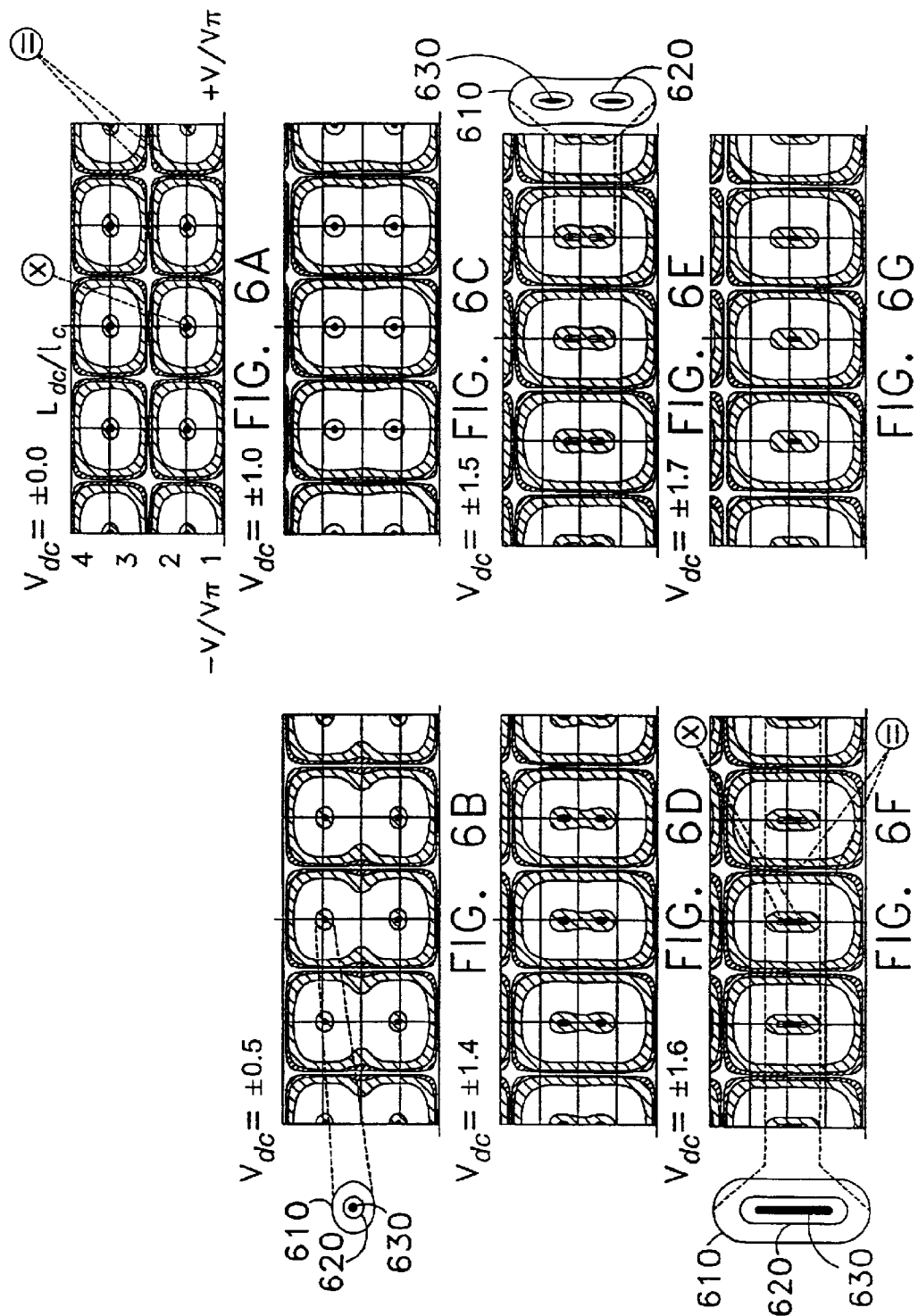

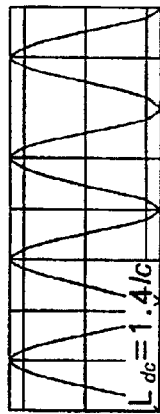
FIG. 14A $L_{dc}=1.2Ic$
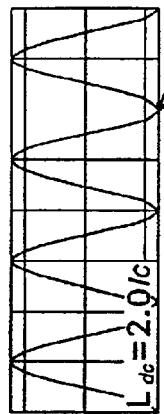
FIG. 14B $L_{dc}=1.4Ic$
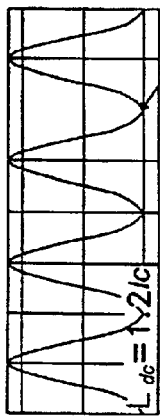
FIG. 14C $L_{dc}=1.6Ic$
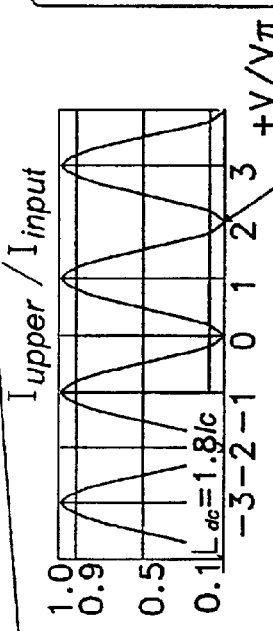
FIG. 14D $L_{dc}=1.8Ic$
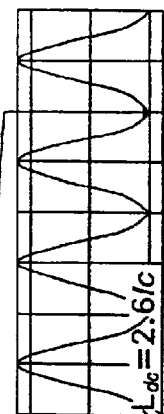
FIG. 14E $L_{dc}=2.0Ic$
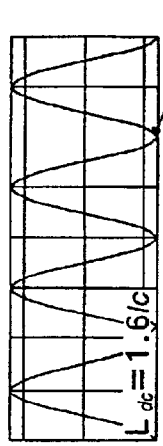
FIG. 14F $L_{dc}=2.2Ic$
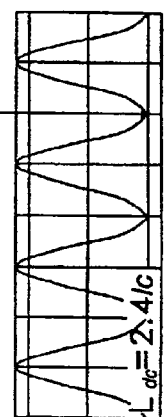
FIG. 14G $L_{dc}=2.4Ic$
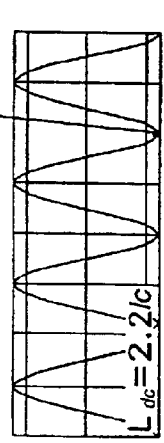
FIG. 14H $L_{dc}=2.6Ic$

POLARIZATION INDEPENDENT BROAD WAVELENGTH BAND OPTICAL SWITCHES/MODULATORS

This application claims priority to U.S. Provisional Application Ser. Nos. 60/204,774 and 60/204,775, both filed May 17, 2000, whose entire disclosure is incorporated herein by reference.

BACKGROUND OF THE INVENTION

1. Field of the Invention

The present invention relates to electro-optic devices, and in particular, to polarization independent broadband optical modulators and switches for wideband fiberoptic networks.

2. Background of the Related Art

A balanced bridge optical switch has two input and two output waveguides. Two $\frac{1}{2}l_c$ (half a coupling length) 3-dB (i.e., 50:50 power splitter) directional couplers and a phase modulated interferometer waveguide pair are used. Note that "$l_c$" is the characteristic coupling length of a directional coupler, which is the length of the directional coupler necessary to transfer substantially all the power from a first waveguide to a second waveguide. The input 3-dB coupler is used to equally divide an input signal received by an upper input waveguide into both the upper and lower waveguides prior to entering an interferometer section of the balanced bridge optical switch. An output $\frac{1}{2}l_c$ directional coupler rejoins the electro-optical phase modulated signal from the interferometer section back into the upper output waveguide for a "straight-thru" path (i.e., "on" or (=) bar state) or the lower output waveguide in the "cross-over" path (i.e., "off" or switched (×) state). If the optical path lengths of the two waveguides are identical in the middle interferometer section, the two optical waves arrive at the output ($\frac{1}{2}l_c$) 3-dB coupler section and recombined coherently producing an optical signal that transfers all into the lower waveguide or crossover path. However, if there is a 180° phase difference between the two optical path lengths in the interferometer section, the two optical waves will recombine and transfer back to upper waveguides or the straight through path. Thus, electro-optical phase modulation of the two optical waves in the interferometer section results in an amplitude modulation at each of the output waveguides and the device can be used as a 1×2 or a 2×2 optical switch.

FIG. 1 illustrates a related art polarization-independent 2×2 electro-optic switch 100 based on a balanced-bridge interferometric waveguide structure. As shown in FIG. 1, the related art switch 100 includes upper and lower waveguide patterns 120, 130 formed in a X-cut Z-propagation lithium niobate (LiNbO₃) electro-optic substrate 110. The switch 100 includes a 3 dB-directional coupler section 142 (50:50 power splitter) having an interaction length of $L_B=\frac{1}{2}L_{dc}$, an interferometer section of length $L_e$, and an output 3 dB-directional coupler section 146 having an interaction length of $L_B=\frac{1}{2}L_{dc}$, where $L_B=\frac{1}{2}L_{dc}$, $L_{dc}$ equals combined length of the two couplers, and $l_c$ equals characteristic coupling length of the directional coupler. Note that "interaction length" and "effective coupling length" are used interchangeably to describe the actual length of the waveguides in a directional coupler over which a signal may couple from a first waveguide to a second waveguide. Also note that the effective coupling length may be described in terms or units of characteristic coupling length $l_c$. Thus a range of effective coupling lengths or interaction lengths for a directional coupler can be indicated as $0.75l_c$ to $1.1l_c$. The input and output 3 dB-directional coupler sections operate as 50:50 power splitters and are preferably identical with a combined length where $l_c$ is the characteristic coupling length of the switch 100. As shown in FIG. 1, the upper waveguide 120 receives an input optical signal $I_{in}$. Under straight-thru switch operations, the input signal $I_{in}$ received by the upper waveguide 120 exits from the waveguide 120 as an output signal $I_{upper}$ (=), and in cross-over switch operations, the input signal $I_{in}$ enters the upper waveguide 120 but exits through the lower waveguide 130 as $I_{lower}$ (×).

For the related art switch 100, the upper and lower waveguides 120, 130 are single mode for each of two polarizations (TE, TM), and therefore support one TE mode and one TM mode each, where the "TE mode" is the transverse electric field mode, and the "TM mode" is the transverse magnetic field mode. A normalized applied voltage V applied in the interferometer section 144 is applied with an electric field in the Y-direction ($E_y$) that induces a differential propagation constant $\Delta\beta$ ("$\Delta\beta$") between the two interferometric sections of the upper and lower waveguides 120, 130 of length $L_e$ via the linear electro-optic effect. The length $L_e$ is the length of the electrodes 150, 152,154. Electrodes 150, 152, 154 are arranged in a push-pull configuration to maximize the electro-optically induced $\Delta\beta$ between the upper and lower waveguides 120, 130 in the interferometer section 144. Thus, the electrode 152 receives the normalized applied voltage V and the electrodes 150 and 154 receive a ground potential. As shown in FIG. 1, the placement of the electrodes 150, 152, 154 maximizes the E-field along the Y-axis inside the waveguides.

For the X-cut substrate 110, when the waveguide propagation direction in the waveguides 120, 130 is along the Z-axis (optic axis), both the TE and TM modes see the same ordinary index ($n_o$). Thus, both the TE and TM polarization modes are nearly degenerated and will behave in approximately the same way. The electro-optic ("EO") interaction for the TE and TM modes with the $E_y$ field in the interferometer section are via EO coefficients that are equal but opposite in sign (i.e., $r_{22}$, $-r_{22}$) in the lithium niobate substrate 110. Therefore, the magnitudes of the $\Delta\beta_i$ for both the TM and TE modes are the same in the interferometer section 144 where $\Delta\beta_i$ is the difference in the propagation constants between the two waveguide pair in the middle "interference" section, and $\Delta\beta_{dc}$ is the difference in the propagation constants between the waveguide pair in the "input" and "output" directional coupler sections. In other words, the EO interactions in the interferometer section 144 in the TE mode is proportional to $+r_{22}$ ($E_y$) and the TM mode is proportional to $-r_{22}$ ($E_y$) as the corresponding change in the propagation constants is via the electric field in the Y-axis direction.

In FIG. 2A, $I_{cross-over}$ and $I_{straight-thru}$ conditions are illustrated for the related art switch 100, where optical power is a vertical axis and the ratio of normalized applied voltage to $V_\pi$, which is the voltage required to cause a 180° phase shift between the two arms of the interferometer $V/V_\pi$, is a horizontal axis. As shown in FIG. 2A, the input signal $I_{in}$ is output as $I_{cross}$ when $V/V_\pi$ is equal to −4, −2, 0, 2, 4 and $I_{in}$ is output as $I_{upper}$ ($I_{straight-thru}$) when $V/V_\pi$ is equal to −3, −1, 1, 3.

In FIG. 2A, the optical power is illustrated from 0 to 1 corresponding to an on (=) or off (×) state of the switch 100. For a high performance, low-crosstalk switching device, the input and output directional couplers 142, 146 of the switch 100 must behave as 3 dB-couplers for both the TE and TM modes simultaneously. In this case of zero (0) voltage, both the TE and TM modes entering an input port of the upper waveguide 120 will exit a lower output "cross-over" port (×)

of the lower waveguide 130. When voltage is applied to the interferometer section 144 of the switch 100 with an electric field in the Y-axis direction, the EO induced change in the waveguide indices for the TE and TM modes are exactly equal, but with opposite sign because of the $r_{22}$, $-r_{22}$ linear EO coefficients. Because of the symmetric nature of the switching characteristics of the balanced bridge interferometer with respect to voltage, both the TE and TM modes would be switched to the upper output port as shown in FIG. 2A when a normalized applied voltage $V=V_\pi$ (or $V=-V_\pi$) is applied. Thus, the related art optical switch 100 provides polarization independent switching. However, as shown in FIG. 2B, for effective operation of the related art switch 100, the length of each of the directional coupler sections 142, 144 $L_B (=½L_{dc})$ must be very precisely manufactured to be equal to $½l_c$, which is the coupling length of the switch 100. When $L_{dc} (=2 L_B)$ does not equal $l_c$, light entering the upper input channel cannot be switched completely from the output port (=) of the waveguide 120 to the output port (×) of the other waveguide 130. Note that $L_{dc}$ equals $2 \times (L_B)$, and $L_B$=length of each 3 dB coupler (input and output). Thus, $L_B$ must precisely equal $½l_c$ for a low crosstalk switch. When $L_{dc}$ does not equal $l_c$, the crosstalk of the switch increases rapidly as $L_{dc}$ deviates from $l_c$. This is shown in FIG. 2B, for $L_{dc}$=$0.6l_c$, $0.8l_c$, $1.0l_c$ and $1.4l_c$. Accordingly, when $L_{dc}$ does not equal $1.0l_c$ precisely, the high crosstalk can make the switch 100 a non-working switch.

As described above, the related art polarization independent optical switches have various disadvantages. Crosstalk of the switch depends on fabricating optimal 3 dB couplers. $L_{dc}$ precision is limited by fabrication tolerances, and a precise length for the 3 dB couplers is hard to achieve. For example, a 10% variation in coupler length can render an optical switch defective. Thus, a low crosstalk (<−25dB) switch is difficult to achieve. Further, an optimal fabrication parameter to achieve a 3 dB-coupler for the TE mode is often somewhat different than the optimal fabrication parameter required for a 3 dB-coupler for the TM mode. Thus, it is difficult to achieve an exact 3 dB coupling for both TE and TM modes simultaneously. This will result in an undesirable high crosstalk for either TE or TM modes or both.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an optical switch and method for operating same that substantially obviates one or more problems caused by disadvantages and limitations of the related art.

Another object of the present invention is to provide a polarization independent balanced-bridge interferometric waveguide switch and method for operating same that is a low crosstalk switch (less than −20 dB).

Another object of the present invention is to provide a polarization independent 1×2 or 2×2 electro-optic switch and method for operating same that provides polarization-independent switch operation over a broad wavelength.

Another object of the present invention is to provide a polarization independent 2×2 electro-optic switch and method for operating same that provides a reduced polarization mode dispersion.

Another object of the present invention is to provide a polarization independent 2×2 electro-optic switch and method for operating same that provides a reduced polarization dependent loss switch.

Another object of the present invention is to provide a polarization independent 2×2 electro-optic switch and method for operating same that uses differential propagation constant $\Delta\beta_{dc}$ coupling in the input and output couplers.

Another object of the present invention is to provide a polarization independent 2×2 electro-optic switch and method for operating same that uses tunable $\Delta\beta_{dc}$ directional couplers in the input and output power splitters.

Another object of the present invention is to provide a polarization independent 2×2 electro-optic switch and method for operating same that uses voltage induced linear electro-optic effect to induce $\Delta\beta_{dc}$ in the input and output directional couplers.

Another object of the present invention is to provide a polarization independent 2×2 electro-optic switch and method for operating same that uses asymmetric-waveguide widths to achieve the proper $\Delta\beta_{dc}$.

Another object of the present invention is to provide a polarization independent 2×2 electro-optic switch and method for operating same that uses directional couplers having different waveguide indices between the upper and lower waveguides that result in a $\Delta\beta_{dc}$ between the upper and lower waveguides.

In order to achieve at least the above-described objects of the present invention in whole or in part, there is provided a device including an optical input, a first coupler optically coupled to the optical input having a first $+\Delta\beta_{dc}$ mismatch, an optical interferometer optically coupled to the first coupler and having a first optical path and a second optical path, the interferometer having an input that receives a signal voltage, wherein an optical path length difference between the first and second optical paths is induced in response to the signal voltage, and a second coupler optically coupled to the optical interferometer and capable of having a second $-\Delta\beta_{dc}$ mismatch.

To further achieve the above-described objects of the present invention in whole or in parts, there is provided a device including an optical input a first coupler optically coupled to the optical input having a first $+\Delta\beta_{dc}$ mismatch, a first optical waveguide optically coupled to the first coupler and having a first path length, a second optical waveguide optically coupled to the first coupler and having a second path length, a control signal electrically coupled to at least one of the first and second optical waveguides, whereby an optical path length difference between the first and second optical paths is controlled in response to the control signal, and a second coupler optically coupled to the first and second optical waveguides and capable of having a second $-\Delta\beta_{dc}$ mismatch.

To further achieve the above-described objects of the present invention in whole or in parts, there is provided a device including at least one optical input, a first coupler optically coupled to the optical input having a first optical propagation constant $\Delta\beta$ mismatch, an optical interferometer optically coupled to the first coupler and having a first optical path and a second optical path, the interferometer having an input that receives a signal voltage, wherein an optical path length difference between the first and second optical paths is induced in response to the signal voltage, second coupler optically coupled to the optical interferometer and capable of having a second optical propagation constant $\Delta\beta$ mismatch, and at least one optical output optically coupled to the second coupler.

To further achieve the above-described objects of the present invention in whole or in parts, there is provided a device including at least one optical input, an input directional coupler optically coupled to the at least one optical input having a first optical propagation constant Δβ mismatch, a first optical waveguide optically coupled to the input directional coupler and having a first optical path length, a second optical waveguide optically coupled to the input directional coupler and having a second optical path length, a control signal electrically coupled to at least one of the first and second optical waveguides, whereby an optical path length difference between the first and second optical paths is controllable variable in response to the control signal, and an output directional coupler optically coupled to the first and second optical waveguides and capable of having a second optical propagation constant Δβ mismatch.

To further achieve the above-described objects of the present invention in whole or in parts, there is provided a balanced bridge optical switch including at least one input port, an input directional coupler having a first optical propagation constant Δβ mismatch coupled to the at least one input port, an interferometer optically coupled to the input directional coupler, an output directional coupler having a second optical propagation constant Δβ mismatch optically coupled to the interferometer, at least one output port optically coupled to the output directional coupler, whereby a first optical propagation constant Δβ mismatch is adjusted to provide an approximate 50% power split at the input directional coupler for a range of effective coupling lengths from approximately $0.75l_c$ to approximately $1.1l_c$, and a second optical propagation constant Δβ mismatch is adjusted to provide an approximate 50% power split at the output directional coupler for a range of effective coupling lengths from approximately $0.75l_c$ to approximately $1.1l_c$.

To further achieve the above-described objects of the present invention in whole or in parts, there is provided a balanced bridge optical switch including at least one input port, an input directional coupler having a first optical propagation constant Δβ mismatch coupled to the at least one input port, an interferometer optically coupled to the input directional coupler, an output directional coupler having a second optical propagation constant Δβ mismatch optically coupled to the interferometer, at least two output ports optically coupled to the output directional coupler, whereby the effective coupling length of the input directional coupler combined with the effective coupling length of the output directional coupler has a range from approximately $1.5l_c$ to approximately $2.2l_c$, and a first optical propagation constant Δβ mismatch is determined and a second optical propagation constant Δβ mismatch is determined such that crosstalk between the at least two output ports is below a desired amount.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 is a diagram that illustrates a plot of optical output versus normalized applied voltage for the optical switch shown in FIGS. 3A and 3B;

FIGS. 5A-5C are diagrams that illustrate plots of normalized optical output versus normalized applied voltage in the switch of FIGS. 3A and 3B;

FIGS. 6A-6G are diagrams that illustrate output power contours of −10 dB, −20 dB and −30 dB for normalized optical output plotted against normalized applied voltage in a range of input/output bias voltages;

FIGS. 14A through 14H show optical outputs vs applied voltage for the present invention; and, FIG. 15 shows contour plots of straight-thru and cross-over switch states for a related art balance bridge interferometer.

DETAILED DESCRIPTION OF PREFERRED EMBODIMENTS

Figure 3A:
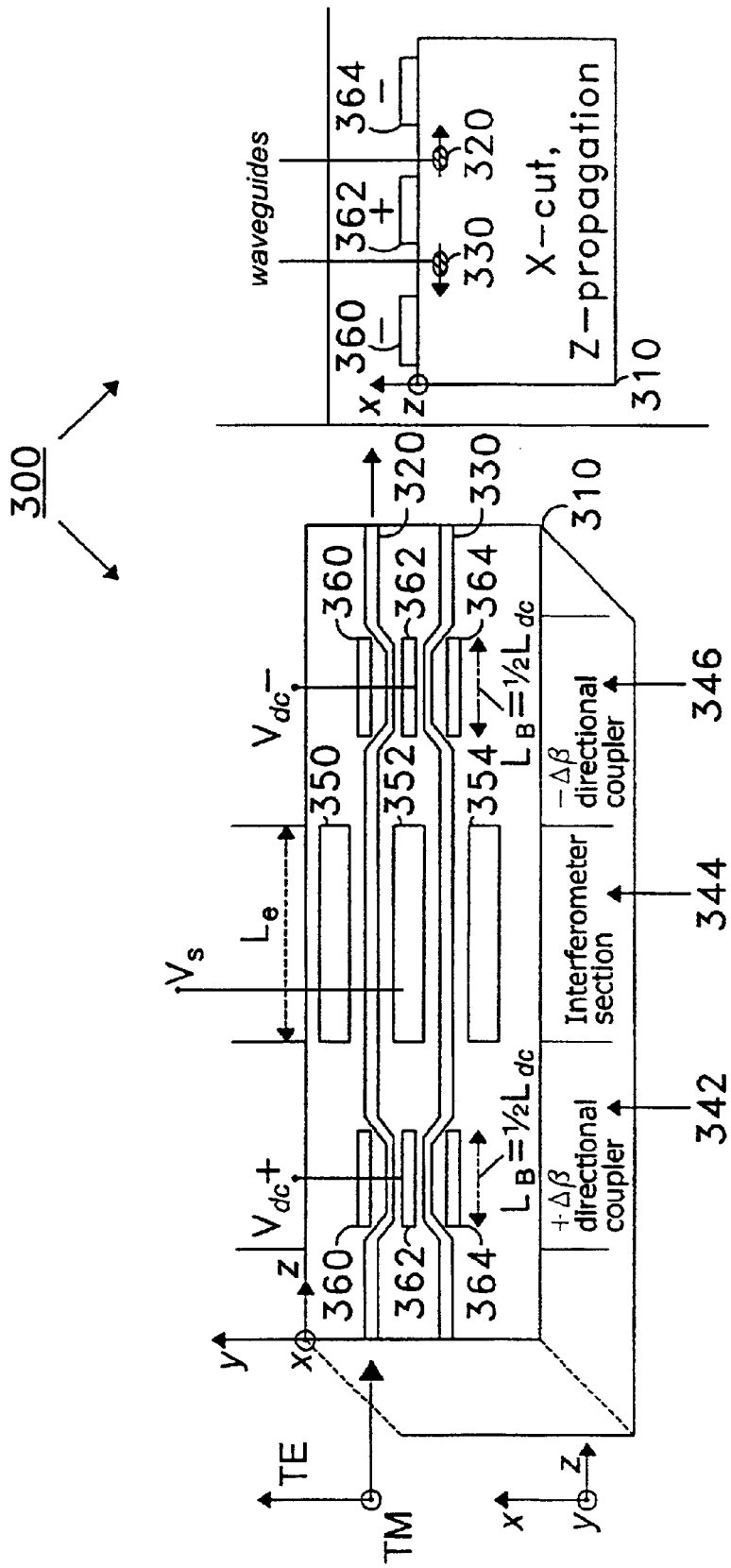
FIGS. 3A and 3B are diagrams that illustrates a schematic plan view of a preferred embodiment of a polarization-independent 2×2 electro-optic switch according to the present invention, and its output.

FIG. 3A is a diagram that illustrates a first preferred embodiment of a broad wavelength band polarization independent optical switch, in accordance with the present invention. "Broad wavelength band" includes the range of wavelengths from at least approximately 1530 nm (nanometer) to at least approximately 1610 nm. The switch's functioning wavelength range includes the C and L bands, where the C band spans approximately 1530 nm to 1565 nm, and the L band spans approximately 1565 nm to 1610 nm. However, the switch's functioning is not limited to the wavelength range encompassing the L and C band, and the switch will function substantially below and substantially above both those bands, inclusively. "Polarization independent" means that the switch may effectively switch any polarization or all components of an optical signal. The first preferred embodiment of the optical switch is a polarization-independent, broad-wavelength band 2×2 switch using a balanced-bridge interferometer with asymmetrically-biased ($\pm\Delta\beta_{dc}$) directional couplers.

As shown in FIG. 3A, an optical switch 300 includes upper and lower waveguide patterns 320,330 preferably formed in an X-axis cut, Z-axis propagation electro-optic substrate 310. The electro-optic substrate is preferably lithium niobate ($LiNbO_3$). The switch 300 includes a first directional coupler section 342, an interferometer section 344 and a second directional coupler section 346. The first directional coupler 342 has an electrode length of $L_B$, the interferometer section 344 has an electrode length $L_e$ and the second directional coupler section 346 has an electrode length of $L_B$. The first and second directional coupler sections 342, 346 preferably operate the same with opposite directivities and respectively couple an input and output of the interferometer section 344. The first and second directional coupler sections 342, 346 have equal magnitude but opposite in sign differential propagation constants $\Delta\beta_{dc}$, i.e., the input coupler is $+\Delta\beta_{dc}$ biased and the output coupler is $-\Delta\beta_{dc}$ biased and vice versa. While it is perferable that the signs of the differential propagation $\Delta\beta_{dc}$ mismatches for the directional couplers are opposite, such a sign difference is not necessary. Additionally, when there is a sign difference between the differential propagation $\Delta\beta_{dc}$ mismatches for the directional couplers, either order will work. That is, the first directional coupler's differential propagation $\Delta\beta_{dc}$ mismatch may have a positive sign and the second directional coupler's differential propagation $\Delta\beta_{dc}$ mismatch may have a negative sign, or the first directional coupler's differential propagation $\Delta\beta_{dc}$ mismatch may have a negative sign and the second directional coupler's differential propagation $\Delta\beta_{dc}$ mismatch may have a positive sign. The first and second waveguide pair sections 342, 346 experience evanescent coupling while the interferometer section 344 does not.

Both the first and second directional couplers may have a differential propagation $\Delta\beta$ mismatch, and the interferometer may have $\Delta\beta$ mismatch. The differential propagation $\Delta\beta$ mismatch for the couplers may be referred to as either $\Delta\beta$ or $\Delta\beta_{dc}$, and the $\Delta\beta$ mismatch of the interferometer may be referred to as $\Delta\beta$ or $\Delta\beta_E$. When the mismatch is simply referred to as $\Delta\beta$, whether it is the $\Delta\beta$ mismatch of a coupler or $\Delta\beta$ mismatch of an interferometer is determined by the context of the reference. "Coupler" refers to either directional coupler of the switch. "First coupler," "first directional coupler," "input coupler," and "input directional coupler" and the like are synonymous. "Second coupler," "second directional coupler," "output coupler," "output directional coupler," and the like are also synonymous. Similarly, a "first optical propagation constant $\Delta\beta$ mismatch" refers to the $\Delta\beta$ in the first or input coupler, and "second optical propagation constant $\Delta\beta$ mismatch" refers to the $\Delta\beta$ mismatch in the second or output coupler.

The optical propagation $\Delta\beta_{dc}$ mismatch in a coupler may be achieved by having the propagation constant in the first waveguide of the coupler be a first value $\beta_1$, and the optical propagation constant in the second waveguide of the coupler be a second value $\beta_2$. Thus, $\beta_1-\beta_2=+\Delta\beta_{dc}$, and $\beta_2-\beta_1=-\Delta\beta_{dc}$. A coupler with an optical propagation $\Delta\beta_{dc}$ mismatch has a value of $\beta_1$ for one of its waveguides and a value of $\beta_2$ for another of its waveguides.

As shown in FIG. 3A, the upper waveguide 320 of the switch 300 receives an input optical signal $I_{in}$ that exits entirely from the waveguide 320 as an output signal $I_{upper}$ in a "straight-thru" path or "bar (=)" state, and the input signal $I_{in}$ enters the upper waveguide 320 but entirely exits through the lower waveguide 330 as $I_{lower}$ in a "cross-over" path or "(×)" state. For the optical switch 300, the upper and lower waveguides 320, 330 are single moded for both TE and TM polarizations, and therefore support one TE mode and one TM mode each.

A signal voltage $V_S$ applied as a switching voltage in the interferometer section 344 is applied with an electric field in the Y-direction ($E_y$) that induces $\Delta\beta_e$ between the two interferometer arms of the upper and lower waveguides 320,330 via the linear electro-optic effect. The electrode length of the two interferometer arms is $L_e$. The signal voltage can have various waveforms such as sinusoidal, stepped, chirped, sawtooth, DC, off/on, etc. Electrodes generating the electric fields are preferably arranged in a push-pull configuration to increase the electro-optically induced phase difference between the upper and lower waveguides 320, 330 in the interferometer section 344. Thus, in the X-axis cut, Z-axis propagation substrate 310, an electrode 352 receives the signal voltage $V_S$ and electrodes 350 and 354 receives a ground potential.

Figure 10:
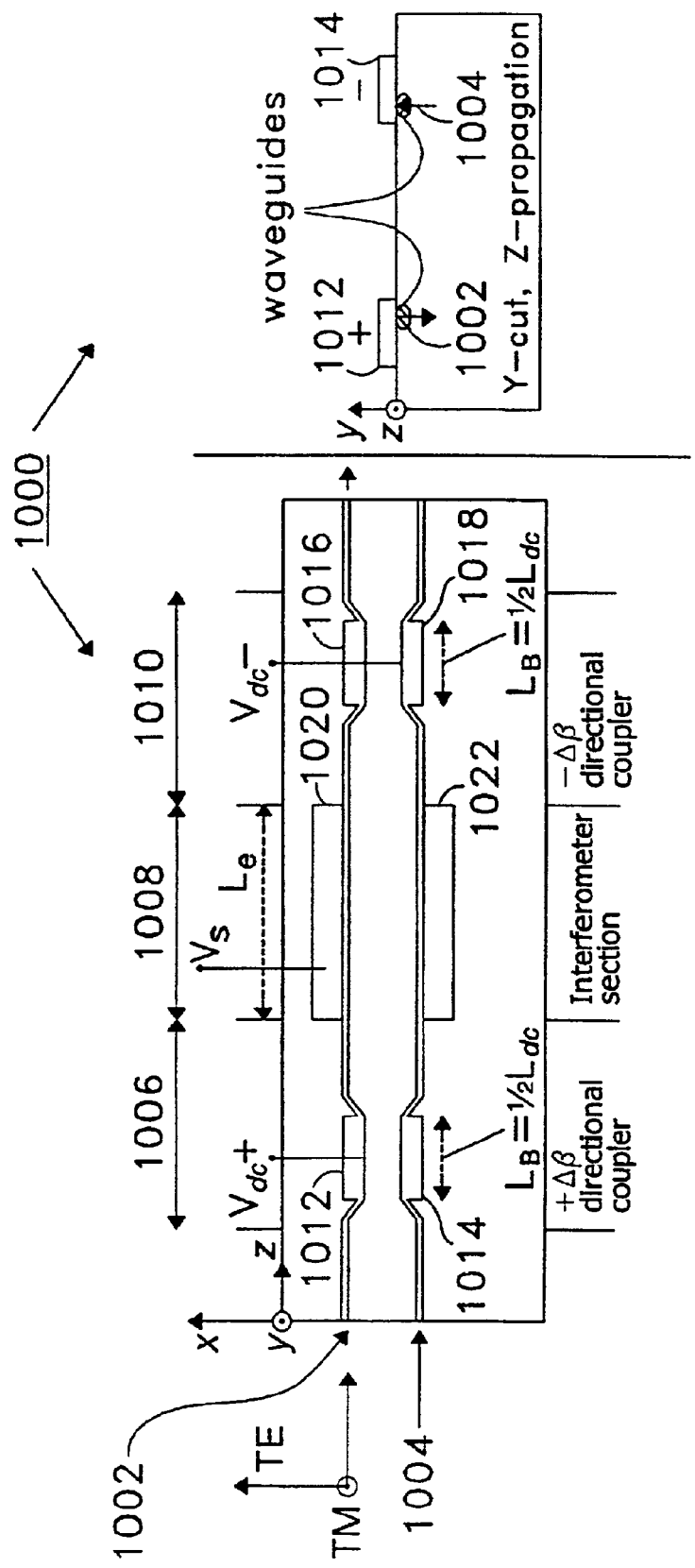
FIG. 10 is a diagram that illustrates a schematic plan view of another preferred embodiment of an optical switch according to the present invention.

As shown in FIG. 3A, electrodes are placed to maximize an electric field in the Y-axis direction of the lithium niobate crystal 310. In the X-axis cut substrate shown in FIG. 3A, the electrodes are placed along side the waveguide so as to increase or maximize horizontal electric field ($E_y$) inside the optical waveguide. Alternatively, tor Y-axis cut Z-axis propagation substrates, the electrodes are preferably placed on top of the waveguides so as to increase or maximize the vertical electric field ($E_y$) inside the optical waveguide (as shown in FIG. 10).

To be polarization independent, the optical switch 300 orients the propagation direction of the waveguides 320, 330 along the Z-axis (optic axis) so that both the TE and TM modes see the same ordinary index ($n_o$). The EO interaction for the TE and TM modes with the $E_y$ field are via electro-optic coefficients that are equal but opposite in sign (i.e., $r_{22}$, $-r_{22}$ in a lithium niobate substrate). Thus, the EO interactions in the interferometer section 344 in the TE mode is $+r_{22}$ ($E_y$) and the TM mode is $-r_{22}$ ($E_y$) as the corresponding change in the propagation constants is via the electric field in the Y-axis direction. Thus, magnitudes of $\Delta\beta_e$ for both the TM and TE modes are the same, but opposite in sign in the interferometer section 344. As shown in FIGS. 5A-5C, optical power for the switch 300 is illustrated as a vertical axis and the ratio of voltages $V/V_\pi$ is a horizontal axis. The optical power is measured by a ratio of an output optical power over an input optical power (e.g., $I_{upper}/I_{input}$) Accordingly, the input signal $I_{in}$ launched via the upper input channel is transmitted as $I_{lower}$ ($I_{cross-over}$) via the waveguide 330 when $V/V_\pi$ is equal to $-4, -2, 0, 2, 4$ and $I_{in}$, launched via the upper input channel, is transmitted as $I_{upper}$ ($I_{straight-thru}$) when the $V/V_\pi$ is equal to $-3, -1, 1, 3$.

Figure 3B:
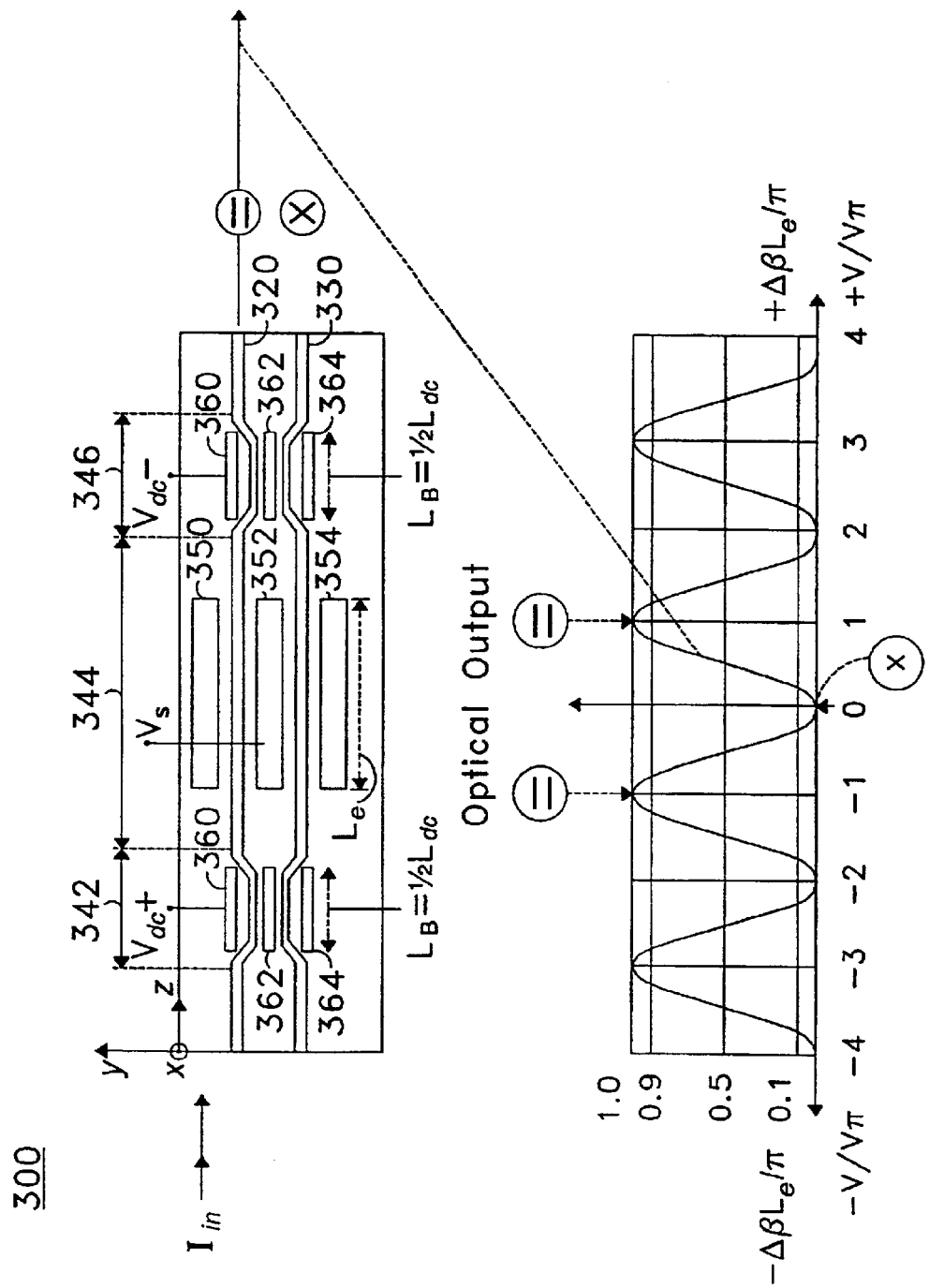

FIG. 3B shows the same embodiment of the switch as shown in FIG. 3A, with like numbers referring to like elements. The graph shows the output of the straight-thru port 320, as a function of applied switching voltage. The maximums of the output labeled "=" correspond to when substantially all the signal exits the interferometer switch 300, through the straight-thru port 320, and the minimum labeled "×" corresponds to when substantially all the signal exits the interferometer through the cross-over port 330.

FIG. 4 is a vertical two-dimensional slice of a three-dimensional plot of the power output of the upper waveguide 320 as a function of normalized applied voltage V/V$_\pi$. When light is launched into the upper input channel of the switch 300, where the X-axis is the ratio between L$_{dc}$/l$_c$ and the Y-axis is the ratio of the normalized applied voltage V/V$_\pi$ in the interferometer section 344. As shown in FIG. 4, crosstalk contour A, crosstalk contour B, and crosstalk contour C represent −10 dB, −20 dB and −30 dB crosstalk contour lines respectively. FIGS. 5A-5C show a particular case where electrodes 360, 362, 364 on the input and output couplers 342, 346 receive the normalized applied voltage bias of V$_{dc}$=Δβ$_{dc}$L$_{dc}$/π of approximately ±1.6 (where Δβ$_{dc}$=difference in the propagation constant of the two waveguides in the directional coupler). The characteristic coupling length of the switch 300 is represented as l$_c$, and the combined length of the two directional coupler is L$_{dc}$.

FIGS. 5A-5C are two-dimensional plots that are horizontal slices through the three-dimensional plot of FIG. 4. FIGS. 5A-5C each represent optical power output by the upper waveguide 320 while the ratio V/V$_\pi$ varies for a fixed ratio of L$_{dc}$/l$_c$. FIG. 5A illustrates where L$_{dc}$ is 2.2l$_c$, FIG. 5B illustrates the case where L$_{dc}$ is 1.8l$_c$, and FIG. 5C illustrates the case where L$_{dc}$ is approximately 1.6l$_c$. (L$_{dc}$ is the total length of the two input and output directional couplers.)

In FIGS. 5A-5C, the optical power is illustrated from 1 to 0, which correspond to an "ON" or "OFF" state of the switch 300, respectively. The Δβ$_{dc}$ (propagation difference between the directional waveguide pair) of the first and second directional couplers 342, 346 must be equal but opposite in sign. This means that the Δβ$_{dc}$ of the second directional coupler 346 must be in the opposite direction of the Δβ$_{dc}$ of the first input coupler 342 but of the same magnitude. This asymmetric Δβ$_{dc}$ is achieved in the first preferred embodiment of the switch 300 by having an equal but opposite bias to the central electrodes 362 of the first and second directional couplers 342, 346 while the outer electrodes 360, 364 are coupled to the ground voltage. Further, the central electrodes 362 preferably have a length L$_E$. The outer electrodes 360, 364 preferably have an equal length being L$_B$.

When the signal voltage V$_S$ is applied to the interferometer section 344 with an electric field in the Y-axis direction, the EO induced change in the waveguide indices for the TE and TM modes are exactly equal, but with opposite sign via the r$_{22}$, −r$_{22}$ linear EO coefficients. Thus, because of the symmetric nature of the switching characteristics of the balanced bridge interferometer with respect to voltage, both the TE and TM modes of the input optical signal I$_{in}$ would be switched to the upper output port as shown when a V$_S$=V$_\pi$ (or V$_S$=−V$_\pi$) is applied. The dark band in the center of each contour on FIG. 4 graphically shows an expanded "cross-over" switch region with very low (−30 dB) crosstalk for the switch when the input and output directional couplers are properly asymmetrically biased V$_{dc}$=Δβ$_{dc}$L$_{dc}$/π of approximately ±1.6. FIG. 4 also shows that an expanded −30 dB crosstalk contour (e.g., vertical slot) is achieved for an expanded range of L$_{dc}$/l$_c$ value from 1.5 to 2.2. This particular family of crosstalk contours illustrated by FIG. 4 is achieved by applying a normalized bias voltage V$_{dc}$=Δβ$_{dc}$L$_{dc}$/π of approximately ±1.6 to the first and second (input and output) directional couplers 342, 346.

FIG. 5A is a two-dimensional plot showing the output of the upper waveguide 320 when L$_{dc}$=2.2l$_c$. Again, the X-axis illustrates power of the signal coming out of the upper waveguide 320, and the Y-axis shows the ratio of the switching voltage V/V$_\pi$. FIG. 4B shows that even though L$_{dc}$ is not equal to l$_c$ and in fact is 2.2l$_c$, the output of the upper waveguide 320 ranges from 0 to 1 thereby exhibiting very low crosstalk being <−30 dB between the ON (upper) and the OFF (lower) outputs of the switch 300. FIG. 5B is a two-dimensional graph for the special case of L$_{dc}$=1.8l$_c$.

FIG. 5B shows that when L$_{dc}$=1.8l$_c$ the output from the upper waveguide 320 ranges from 0 to 1 through the range of normalized applied voltages even though L$_{dc}$ does not equal l$_c$ and in fact FIG. 4C shows that the switch 300 functions as well when L$_{dc}$=1.8l$_c$ as it does when L$_{dc}$=2.2l$_c$. Thus, FIG. 5B shows the switch 300 exhibits crosstalk being <−30 dB for the ratio L$_{dc}$=2.2l$_c$.

FIG. 5C is another two-dimensional plot showing the output of the upper waveguide 320 for the values of L$_{dc}$≈1.6l$_c$ for a range of switching voltages. Once again FIG. 5C shows that the output of the upper waveguide ranges 320 from 0 to 1 for the range of normalized applied voltages V when L$_{dc}$ is not equal to l$_c$ but L$_{dc}$≈1.6l$_c$.

Figure 1:
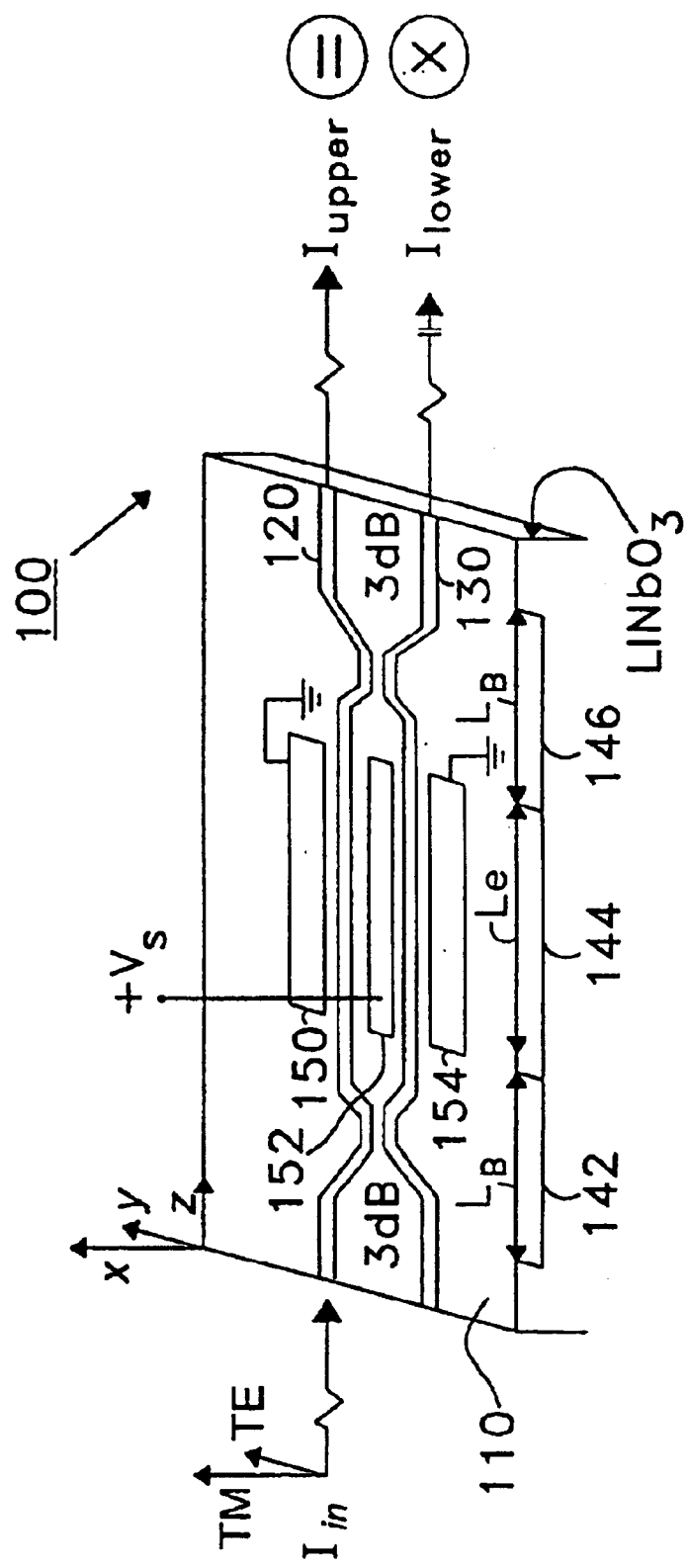
FIG. 1 is a diagram that illustrates a related art polarization-independent 2×2 electro-optic switch based on a balanced-bridge interferometric waveguide.
Figure 2A:
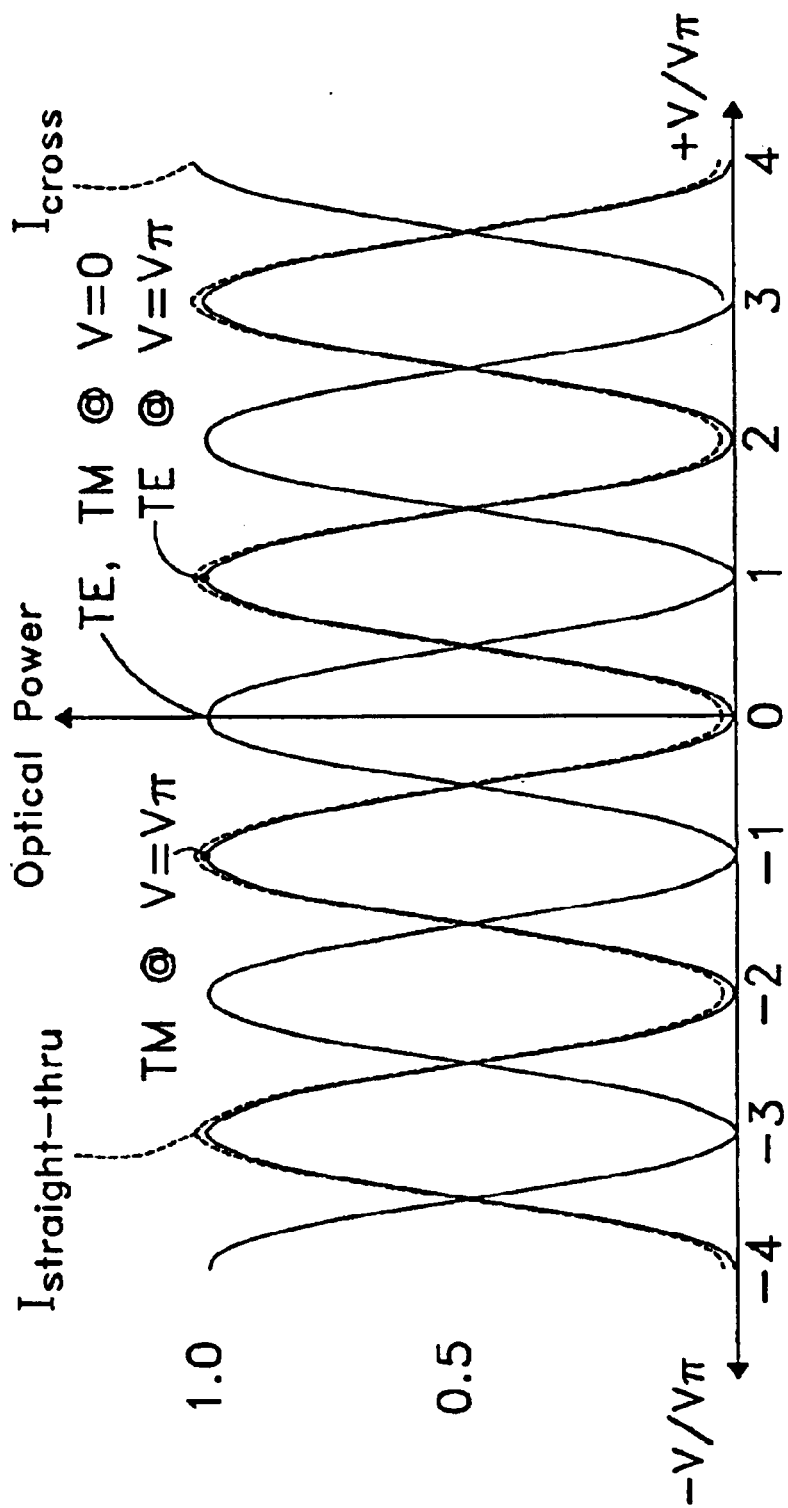
FIG. 2A is a diagram that illustrates optical output plotted against applied voltage for the related art optical switch of FIG. 1.
Figures 2B, 2C:
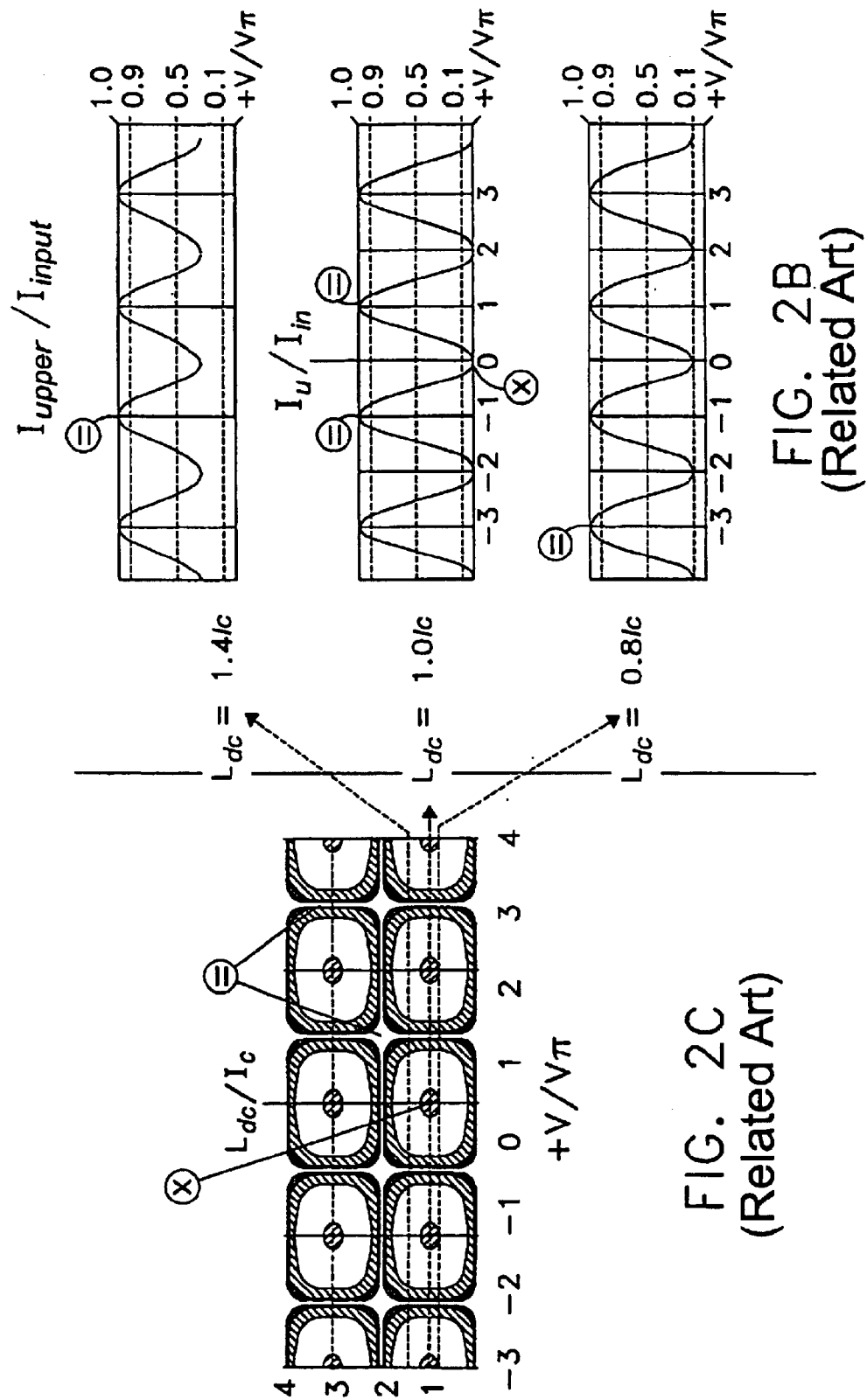
FIG. 2B is a diagram that illustrates normalized optical output plotted against normalized applied voltage for various ratios of length of the directional coupler over characteristic coupling length of the directional coupler ($L_{dc}/l_c$)
FIG. 2C is a diagram that illustrates a plot of optical output versus normalized applied voltage for an optical switch as shown in FIG. 1.

Taken together, FIGS. 5A-5C graphically illustrate that the directional couplers 342, 346 can have a range of L$_{dc}$ (or a range of ratios 1.5<L$_{dc}$/l$_c$<2.2) and the switch 300 still operates as a low −30 dB crosstalk switch. This is what is meant by the switch having expanded cross-over region and a −30 dB crosstalk contour (e.g., slot) for both the TE and TM modes. The switch 300 differs from the related art because the related art does not exhibit an expanded −30 dB crosstalk contour but merely has a −30 dB point when L$_{dc}$=l$_c$ as shown in FIG. 2C.

According to the first preferred embodiment of the switch 300, l$_{dc}$ is the total length of the combined directional couplers, l$_c$ is the characteristic coupling length for the directional coupler sections 342 and 346. L$_B$ is the electrode length of each directional coupler that is preferably equal to ½ L$_{dc}$. The signal voltage V$_S$ is preferably a normalized applied voltage, and is equal to Δβ$_e$L$_e$/π where L$_e$ is the electrode length for the interferometer section 344, and Δβ$_e$ is the electron optically induced propagation difference between the two interferometric waveguide pair. Thus, normalized directional coupler bias voltage V$_{dc}$=Δβ$_{dc}$L$_{dc}$/π where L$_B$ (=½L$_{dc}$) is the electrode length for each of the input and output directional couplers, and Δβ$_{dc}$ is the electro-optically induced Δβ$_{dc}$ between the waveguide pair in the directional coupler region.

Thus, the first preferred embodiment of the optical switch 300 uses a balanced bridge interferometer waveguide structure with asymmetrically-bias Δβ$_{dc}$-directional coupler structures 342 and 346, with an equal magnitude, but an opposite sign for the directivity. The directional couplers 342 and 346, are preferably designed such that the effective Δβ$_{dc}$L$_{dc}$/π is approximately equal to 1.6, which provides the favorable extinction ratios with an extended −30 dB crosstalk contour for a given coupling length ratio L$_{dc}$/l$_c$. Accordingly, to maintain a −30 dB optical switch, the total (including the input and output) directional coupler effective length (L$_{dc}$) can be in the range of ~1.5 to 2.2 times the characteristic coupling length l$_c$ of the directional coupler. Evanescent coupling occurs in the input and output directional couplers but not in the interferometer section. Light for both TE and TM polarizations is switched between the two outputs (e.g., I$_{upper}$, I$_{lower}$) by applying a signal voltage V$_S$ to the interferometer section equivalent to V$_\pi$, which is the voltage required to electro-optically induce a phase mismatch of π (180°) between the two waveguides.

The first preferred embodiment generates the asymmetrically-biased Δβ$_{dc}$ input and output directional couplers using an applied voltage to induce the Δβ$_{dc}$ change using the linear electro-optic effect. However, the present invention is not intended to be so limited.

As shown in FIGS. 6A-6G, the crosstalk contour plots of −10 dB, −20 dB and −30 dB for a vertical axis in units of $L_{dc}/l_c$ and a horizontal axis of a normalized applied voltage $V/V_\pi$ are provided for a progressive directional coupler bias voltage $V_{dc}$ applied to the switch 300. A center of a bullseye is a low point in the optical power output of the waveguide, and represents low (−30 dB) crosstalk, and is shown being a cross-over (×) state 502 for the upper waveguide 320 (in FIG. 3A) in FIG. 5A. For example, a cut on this contour plot along the line of $L_{dc}/l_c=1$ would be a horizontal cut through the center of the bullseye on $V/V_\pi=0$. The bullseye is a low point and one can move horizontally to the right to where $V/V_\pi=1$, which is a high point shown being the bar (=) state 504, for the upper waveguide 320 (in FIG. 3A) in FIG. 5A occurs at $V/V_\pi=1$. Moving horizontally, the next bullseye at $V/V_\pi=2$ is a low point. Accordingly, a horizontal line cut along the $L_{dc}/l_c=1$ horizontal line would produce a sinusoidal varying linear switch line. Similar sinusoids are shown in FIGS. 5A-5C. As another example, if a horizontal cut was taken along the $L_{dc}/l_c=0$ line along a bottom edge of the crosstalk contour plot in FIG. 4, there is no variation in the optical power as $V/V_\pi$ goes from 0 to 2. Thus, there is no coupling to the lower waveguide and all the optical power remains in the upper waveguide output 320 of switch 300. As $V/V_\pi$ is varied there is no switching effect because there is no coupling in the interferometer section 344. Similarly, at the $L_{dc}/l_c=2$ horizontal line in FIG. 6A, each one of the directional couplers is 100% coupling in the bar (=) state. Thus, the first directional coupler 320 couples a portion of the input signal $I_{in}$ to the bottom waveguide 320 and the first directional coupler 320 is exactly one coupling length $l_c$ so all the input signal $I_{in}$ power in the upper waveguide 320 will couple down to the lower waveguide 330 at $V/V_\pi=-2, 0, 2$, etc. In the interferometer section 344, a phase shift would be applied, but since there is no signal in the upper waveguide 320 all power is phase shifted to the bottom waveguide 330. Upon passage through the output directional coupler 346, which is again one coupling length $l_c$, the input signal $I_{in}$ is coupled back to the upper waveguide 320 and output as $I_{upper}$. Thus, the result is similar. All the input power signal is transmitted out the upper waveguide output 320 independent of $V/V_\pi$. As shown in the description of the related art, the bar state can generally be achieved by optical switches, but a −30 dB crosstalk cross-over (×) state is generally difficult to achieve.

When the cross-over (×) state (e.g., as indicated by a bullseye, peanut shape or slot in FIGS. 6A-6G) in the crosstalk contour plots cannot be reached, complete switching from 0 to 1 cannot be achieved by the optical switch and the switch would exhibit high crosstalk (e.g., greater than −20 dB, −30 dB outside the corresponding contours). As shown in FIGS. 6A-6G, a −10 dB cross-over (×) state 610 is larger than a −20 dB cross-over (×) state 620, which is larger than a −30 dB cross-over (×) state 630. In fact, as shown in FIG. 6A, where $V_{dc}=0$, a −30 dB state can rarely be achieved since $L_{dc}$ must be precisely $1l_c$ and such manufacturing tolerances are rarely achieved. However, as shown in FIG. 6F, where $V_{dc}\approx\pm1.6$, a −30 dB crosstalk contour extends from approximately from $L_{dc}/l_c=1.5$ to 2.2. Thus, a horizontal line across the crosstalk contour plot shown in FIG. 6F indicates that a −30 dB switch can achieve 100% switching from 0 to 1 for a large tolerance of $L_{dc}/l_c$ ratios and accordingly a very large tolerance of $L_{dc}$ lengths.

The contour plots of FIGS. 6A-6G can be achieved by applying different bias voltages $\pm V_{dc}$ at the directional couplers 342, 346 in the switch 300 illustrated in FIG. 3A. FIG. 6A is a diagram that shows a crosstalk contour plot with the bias voltage at 0, FIG. 6B is a diagram that shows the crosstalk contour plot with the bias voltage at 0.5, and FIGS. 6C-6G are diagrams that show crosstalk contour plots when $\pm V_{dc}$ is at 1.0, 1.4, 1.5, 1.6 and 1.7, note that $V_{dc}$ is the normalized applied voltage in the unit of $\Delta\beta_{dc}L_{dc}/\pi$ where $L_{dc}$ approximately equals the total length of the combined directional couplers (input and output), $\Delta\beta_{dc}$ equals the difference in propagation constant induced between the two directional coupler waveguide pairs. FIG. 6F is a crosstalk contour plot similar to that shown in FIG. 4 for a bias voltage of approximately 1.6, where $V_{dc}$ is a normalized voltage in the unit of $\Delta\beta_{dc}L_{dc}/\pi$.

The advantage of looking at different bias voltages $V_{dc}$ for the switch 300 illustrated in FIG. 3A, is that an empirical understanding of the advantages according to preferred embodiments can be seen through the series of crosstalk contour plots. FIG. 6A is a crosstalk contour plot of an equivalent related art type switch where there is no asymmetric $\Delta\beta_{dc}$ coupling between the first and second directional couplers. As FIG. 6A illustrates, the cross-over state (×) occupies a very narrow region on the $L_{dc}/l_c$ axis. This indicates that the ratio of $L_{dc}$ to $l_c$ must be tightly controlled in order for a low crosstalk switch to be achieved. FIG. 6B is a crosstalk contour plot showing the output when the normalized bias voltage in the unit of $\Delta\beta_{dc}L_{dc}/\pi$, $V_{dc}$ at the directional couplers 342, 346 is 0.5. The crosstalk contours shown in FIG. 6B are very similar to the contours shown in FIG. 6A. The primary difference being that the −10 dB regions 620 in FIG. 6B have moved closer to each other along the axes $L_{dc}/l_c$. Turning to FIG. 6C where the bias voltage $V_{dc}$ at the directional couplers 342, 346 is 1, the plot illustrates how the −30 dB contours 610, 620, 630 are closer yet along the axis represented by $L_{dc}/l_c$. FIG. 6D shows the crosstalk contour plot where the bias voltages $V_{dc}$ is 1.4. This contour plot shows yet again how the contours 610, 620, 630 have moved closer to each other due to the bias voltage $V_{dc}$ and that there is some overlap in the −10 dB region 610 of the crosstalk contour plot.

FIG. 6E shows the crosstalk contour plot for a bias voltage $V_{dc}$ of 1.5 where the contours 610, 620, 630 have moved even closer and there is almost overlap in the −20 dB region 620. FIG. 6F shows the crosstalk contour plots for the bias voltage 1.6 where the 30 dB contours 630 have merged along the Y-axis representing the $L_{dc}/l_c$ ratio. This elongated crosstalk contour along the Y-axis indicates that for a wide range of ratios of $L_{dc}/l_c$, a cross-over state at −30 dB can be achieved. This indicates that the switch can be manufactured with a wide range of ratios of $L_{dc}/l_c$ and the switch will still function as a low crosstalk switch. FIG. 6G shows contours for a bias voltage $V_{dc}$ of 1.7 at the directional couplers 342, 346. FIG. 6G shows how as the bias voltage $V_{dc}$ is increased above 1.6, the −30 dB crosstalk contours 630 come even closer to one another so that there is less of a range for the ratio of $L_{dc}$ to $l_c$ where the switch 300 will operate with about −30 dB of crosstalk. FIG. 6G is an example whereby the bias voltage $V_{dc}$ has been increased beyond an optimal amount. FIGS. 6A-6G show that as the bias voltage $V_{dc}$ at the directional couplers 342 and 346, is increased, the switch 300 becomes more and more tolerant of a range of ratios of $L_{dc}$ to $l_c$ with an optimal range being reached at about $V_{dc}$ being equal to approximately 1.6 yet still exhibit low crosstalk.

Looking at the difference in the cross-over contours between FIG. 6A which illustrates equivalent operations of a related art switch and FIG. 6F which illustrates operations of a preferred embodiment of the present invention, it is clear that the switch in FIG. 6F allows a much wider range of $L_{dc}$ over $l_c$, which translates into at least a larger tolerance for error in the manufacturing process for the length $L_{dc}$.

In the Z-propagation waveguide switches, even if the TE and TM modes have slightly different characteristics in their respective coupling behavior, or the waveguides using the $+r_{22}$, $-r_{22}$ EO coefficients, that slight difference would merely be represented as a small vertical offset between close horizontal slices in the crosstalk contour plot of FIG. 6F. Thus, the TE and TM modes can be designed to be completed completely within the large available −30 dB crosstalk contour 630 and thus, an effective polarization independent switch is achieved.

In addition, as coupling length is a function of wavelength (λ) of the input signal $I_{in}$, a broad band light source can be used while the optical switch still performs at a −30 dB crosstalk level. Directional coupling length ($l_c$) is a function of the operating wavelength. Therefore, a change in wavelength λ simply means a change in the effect directional coupling length ($L_{dc}/l_c$). Since the switch can be operated with very low crosstalk for an expanded range of ($L_{dc}/l_c$) when $V_{dc}$~1.6, a switch can be operated with very low crosstalk for an expanded range of wavelength as compared to conventional switch.

For example, a broad band light source having wavelengths between 1.4 and 1.7 microns can be permitted for operating an input signal to the optical switch 300.

Figure 7A:
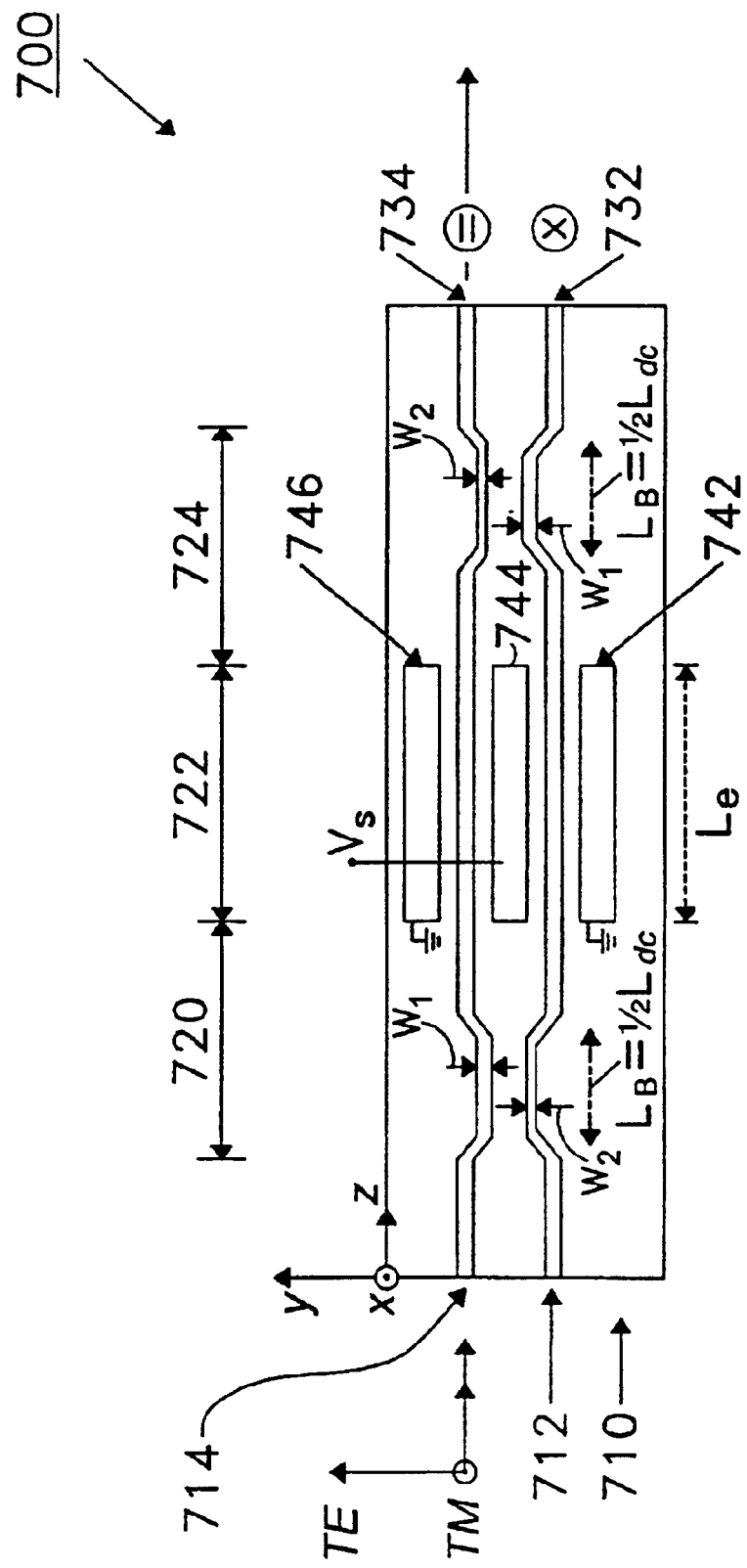
FIGS. 7A and 7B are diagrams that illustrate a schematic plan view of another preferred embodiment of an optical switch according to the present invention, with an associated output signal.

FIG. 7A is a diagram that illustrates a second preferred embodiment of the optical switch in accordance with the present invention. The second preferred embodiment is a polarization independent broad wavelength 2×2 switch relying on a balanced bridge Mach-Zender interferometer constructed on an X-axis cut Z-propagation lithium niobate waveguide (LiNbO₃) structure with asymmetrically biased directional couplers. In the second preferred embodiment, the asymmetric waveguide function is achieved by designing the waveguides to have different widths in the directional coupler section that result in a selected $\Delta\beta_{dc}$ between the waveguides.

As shown in FIG. 7A, an optical switch 700 is formed in an X-axis cut Z-axis propagation electro-optic substrate 710. The EO substrate is preferably lithium niobate LiNbO₃, however, it may be made of other suitable electro-optic substrates. The switch 700 includes a lower waveguide input 712 and an upper waveguide input 714, and the switch 700 also includes a first directional coupler 720, an interferometer section 722 and a second directional coupler 724. The output end of the switch 700 has a lower output waveguide 732 and an upper output waveguide 734. The first and second directional couplers 720 and 724 are close enough so that the two waveguides experience evanescent coupling. The interferometer section 722 of the switch 700 does not experience evanescent coupling between the waveguides. In the interferometer section 722 of the switch 700 are three electrodes 746, 744 and 742. The electrodes 746, 744, 742 parallel the waveguides in the interferometer section 722 with the electrode 746 being along one side of the waveguides, the electrode 742 along the opposite side of the waveguides and the electrode 744 located between the waveguides. Electrodes 742 and 746 are preferably electrically connected to ground potential and the center electrode 744 is connected to the signal voltage $V_S$. Referring to the first and second directional couplers 720 and 724, the total length of the two directional couplers 720,724 is $L_{dc}$, and $L_{dc}$ can be anywhere in the range of 1.5 to 2.2 times the characteristic coupling length $l_c$. The directional coupler effective length $L_{dc}$ is preferably divided between each directional coupler 720 and 724 as $L_B$ and $L_B$. The asymmetric ($\Delta\beta_{dc}$) nature of the couplers is achieved by the un-equal width of the waveguides in the coupler regions.

The asymmetrically biased nature of the directional couplers 720, 724 is achieved in the second embodiment by using asymmetric waveguide widths for the two waveguides in each directional coupler section 720 and 724, which effectively results in a $\Delta\beta_{dc}$ between the waveguides. The two waveguides with different widths are designed so that $\Delta\beta_{dc}$ is equal but opposite in sign, where the propagation difference between them is $\Delta\beta_{dc}L_{dc}/\pi$~1.6 for the output directional coupler. For example, that portion of the waveguide 714 in the first directional coupler 720, is wider, $w_1$, than the corresponding narrower, $w_2$, portion of the waveguide 712 in the first directional coupler 720, and that portion of the waveguide 714 in the second directional coupler 724, is narrower, $w_2$, than the corresponding wider, $w_1$, portion of the waveguide 712 in the second directional coupler 724. $\Delta\beta_{dc}L_{dc}/\pi$≈1.6 is achieved by fabricating the appropriate $\Delta w$, where $\Delta w=(w_1-w_2)$.

All the switch operations are similar to the first case where $\Delta\beta_{dc}L_{dc}/\pi$~1.6 using bias voltage. In operation, the switch 700 receives an optical signal into the input waveguide 714, the first directional coupler 720 divides the optical signal between the two arms of the interferometer section 722, the signal voltage $V_S$ then controls whether the divided optical signal couples into the upper output 734 or the lower output 732 at the second directional coupler 724. The interferometer section 722 controls which waveguide the optical signal couples into using the signal voltage $V_S$ by relying on the EO effect of the lithium niobate substrate. The propagation constant of the lithium niobate substrate is altered based on the direction and the magnitude of the electric field applied by the signal voltage $V_S$. The electrodes 746,744 and 742 are arranged to maximize the difference in $\Delta\beta_i$ when the signal voltage is applied. For an X-cut lithium niobate substrate with waveguide propagation direction along the Z-axis, the electrodes 746,744 and 742 are placed alongside the waveguides in order to maximize the horizontal electric field, $E_y$, inside the two arms of the interferometer section 722.

When the switch 700 is in the bar state (=), the optical signal entering the input waveguide 714 exits the switch 700 at output waveguide 734. When the switch 700 is in the crossover state (×), an input signal at input waveguide 714 exits the switch at output waveguide 732. Because the waveguides are arranged on the lithium niobate substrate so that the propagation direction is along the Z-axis, both the TE and TM modes see the same ordinary index $n_0$. Similar to the first case, when $\Delta\beta_{dc}L_{dc}/\pi$~1.6 using asymmetric waveguide widths, rather than an applied voltage, switch operation with low crosstalk can be achieved for a very wide range of directional coupler parameters ($L_{dc}/l_c$~1.5 to 2.2). Therefore a broad wavelength, polarization independent switch can be achieved.

Figure 7B:
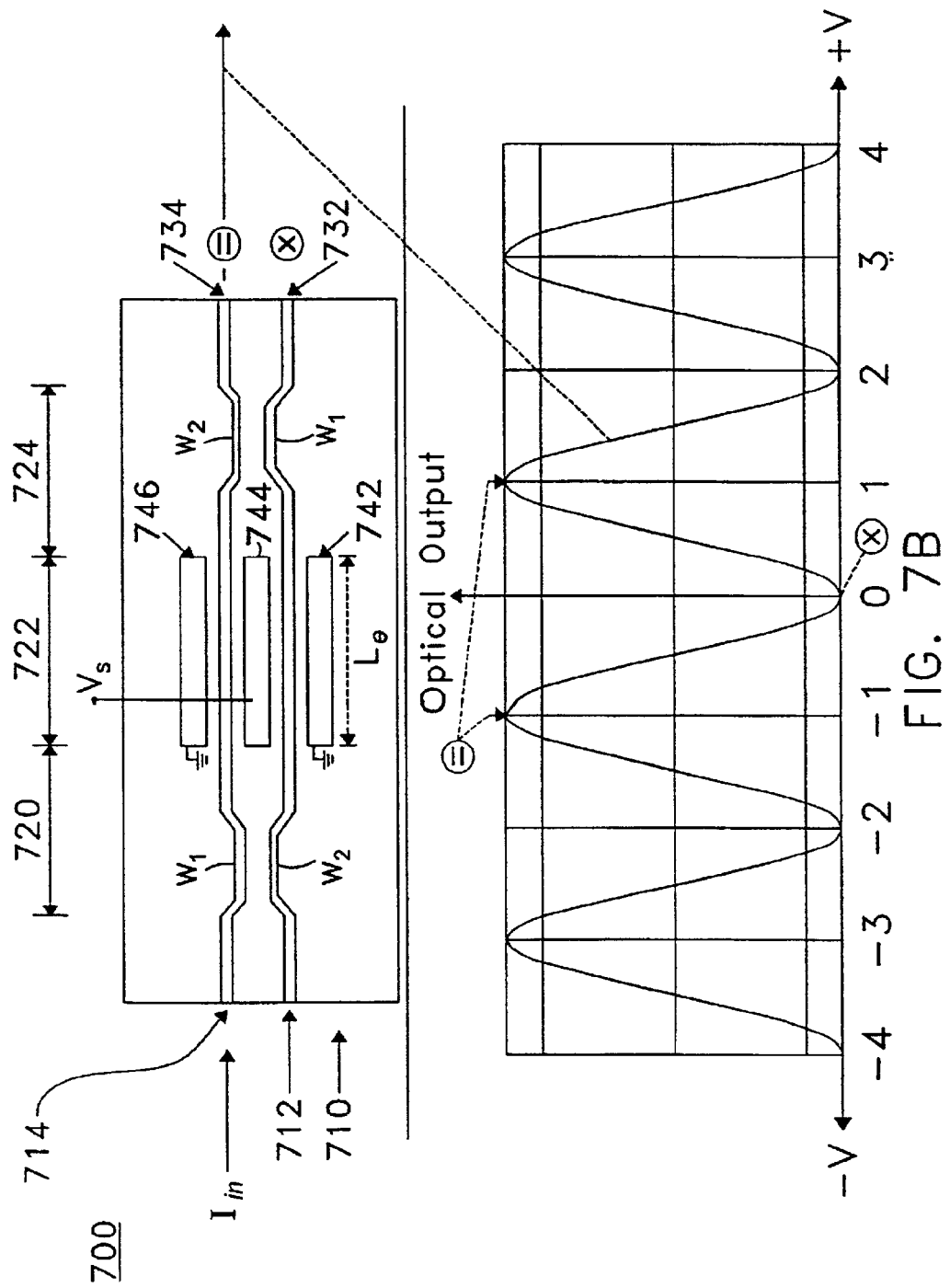

As shown in FIG. 7B shows the same embodiment of the switch as shown in FIG. 7A, with like numbers referring to like elements. The graph of FIG. 7B shows the output of the straight-thru port 734, as a function of applied switching voltage. The maximums of the output labeled "=" correspond to when substantially all the signal exits the interferometer switch 700, through the straight-thru port 734 and the minimum labeled "×" corresponds to when substantially all the signal exits the interferometer switch through the crossover port 732.

Figure 8:
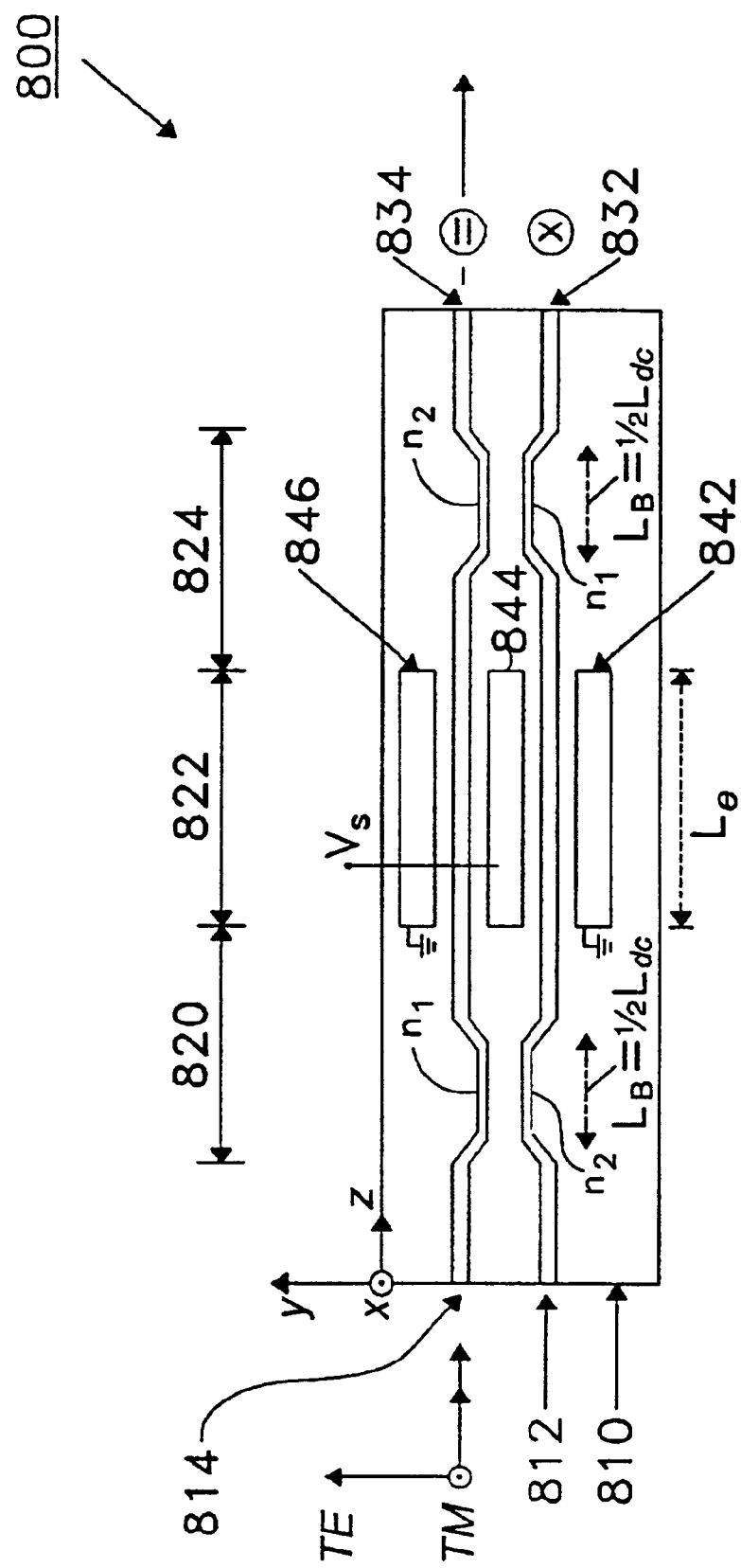
FIGS. 8 and 9 are diagrams that illustrate a schematic plan view of another preferred embodiment of an optical switch according to the present invention, with a graph of its associated output signal.

A third preferred embodiment of an optical switch according to the present invention will now be described. As shown in FIG. 8, a third preferred embodiment of a polarization independent broad wavelength band 2×2 switch 800 uses a Mach-Zender type balanced bridge interferometer waveguide structure with asymmetrically biased directional couplers. The asymmetrically biased nature of the directional couplers is achieved by manufacturing the waveguide with different propagation indices, $n_1$ and $n_2$, between the waveguides in the directional couplers. Different propagation indices for the waveguides can be achieved, for example, by changing the thickness of the initial metal to be diffused or by using material loading effects on the waveguides in the coupler region. Either one of these methods achieves a selected difference in $\Delta\beta_{dc}$ between the waveguides.

Turning to the switch 800 shown in FIG. 8, the waveguide substrate material 810 is made preferably out of lithium niobate. The substrate material is X-cut with a preferred propagation direction along the Z-axis. There are two waveguide inputs 812 and 814. There is a first directional coupler 820 followed by an interferometer section 822, followed by a second directional coupler 824, and on the output end of the switch 800 are two output waveguides 832 and 834. In the interferometer section 822 of the switch 800, are three electrodes 842, 844 and 846. For the optical switch 800, the upper and lower waveguides 814 and 812 are single moded for both the TE and TM modes. For the X-cut lithium niobate substrate, the electrodes 842, 846 are preferably arranged on the outside along opposite sides of the waveguides and the electrode 844 is positioned between the interferometer arms. The electrodes 846 and 842 are electrically connected to ground potential. A signal voltage $V_S$ can be applied to the electrode 844 to alter the propagation constant in the same amount but in different directions for each arm of the interferometer section 822. The first and second directional couplers 820 and 824 are asymmetrically biased directional couplers.

In the third preferred embodiment shown in FIG. 8, the difference in propagation constant ($\Delta\beta_{dc}$) of the directional couplers is achieved by how the waveguides are constructed. In general, a waveguide is constructed on a lithium niobate substrate or other dielectric material by diffusing other materials into the substrate during the manufacturing process to change the optical index locally so that light will then propagate preferentially along the path created by the diffused material. By varying the amount of material diffused into the substrate, the propagation constant of a particular waveguide can be altered. In the third preferred embodiment, a $\Delta\beta_{dc}$ between the first and second directional couplers 820, 824 for each waveguide is achieved by starting with a different amount of metal to be diffused into the substrate. Otherwise known as differential optical loading, the differential propagation constant can also be achieved by asymmetric layering of a dielectric or metal over the waveguide.

By diffusing into, or layering upon, different amounts of metal or dielectric, different indexes of refractions and the corresponding waveguide indexes, $n_1$ and $n_2$, are achieved for each waveguide section in the coupler region. $\pm\Delta n$ is the waveguide's difference in the index of refraction in the coupler region, where $\Delta n=n_1-n_2$, and the sign indicates the direction of the change. $\Delta n$ is the same but opposite in sign between the input (first) 820, and output (second) 824, directional couplers. $\Delta n$ is chosen so that $\Delta\beta_{dc}L_{dc}/\pi\approx\pm1.6$.

Alternatively, one can also change the optical waveguide index by using material such as a dielectric or metal loading effect to change the waveguide propagation index. By properly selecting a $\Delta n$ designed to achieve $\Delta\beta_{dc}L_{dc}/\pi$ to be approximately ±1.6 (equal but opposite in sign between the input and output couplers), a switch with low crosstalk can be achieved for an extended range of directional coupler parameters $L_{dc}/l_c\sim1.5$ to 2.2.

In operation, the switch 800 as shown in FIG. 8 performs similar to the other preferred embodiments. Accordingly, a detailed description is omitted. Further, the switch 800 receives an input signal into input waveguide 814. The input signal is divided between the two waveguides at the first directional coupler 820. The divided signal travels through the upper and lower arms of the interferometer section 822. The upper and lower arms of the interferometer section receive a signal voltage $V_S$ at the center electrode 844 while the outer electrodes 842 and 846 are held at ground. The signal voltage causes an electric field between the electrodes which changes $\Delta\beta_i$ for the interferometer section. This causes a phase shift between the optical signals in the upper and lower arms so that when both signals arrive at the second directional coupler 824, the optical signal is either coupled entirely into output waveguide 834 or output waveguide 832. If the signal couples into waveguide 834, the switch is in a bar state which is a straight-thru configuration. If the signal is coupled into waveguide 832, the switch is in a cross-over state, when the $\Delta\beta_{dc}L_{dc}/\pi\sim1.6$, and the directional couplers 820 and 824 have a total coupling length of $L_{dc}$ equal to about 1.5 to 2.2 times the characteristic coupling length $l_c$. Thus, the total directional coupler length $L_{dc}$ can be anywhere in the range of about 1.5 to 2.2 times the characteristic coupling length $l_c$ of the directional couplers 820, 824.

Figure 9:
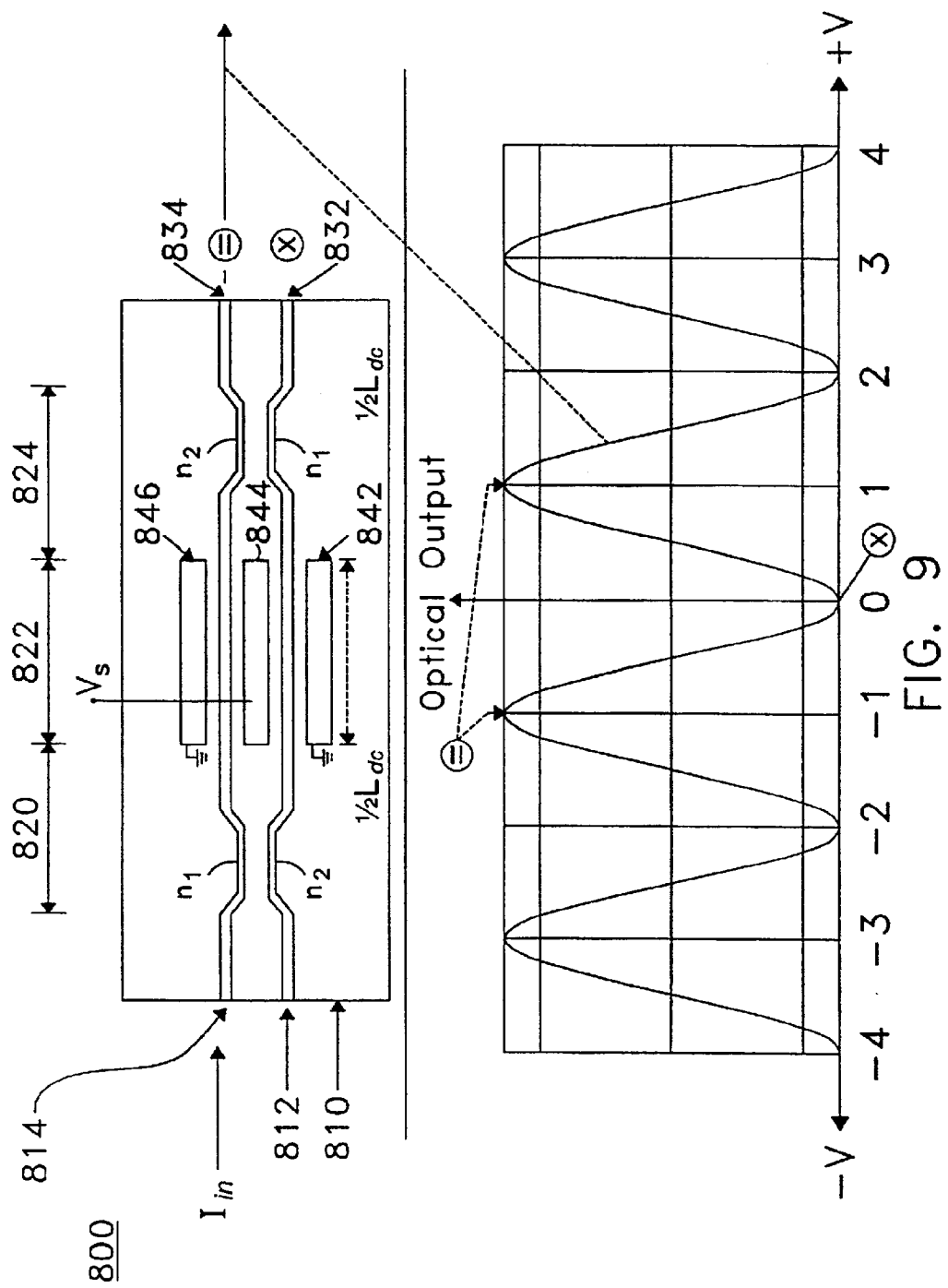

FIG. 9 shows the same embodiment of the switch as shown in FIG. 8, with like numbers referring to like elements. The graph of FIG. 9 shows the output of the straight-thru port 834, as a function of applied switching voltage. The maximums of the output labeled "=" correspond to when substantially all the signal exits the interferometer switch 800, through the straight-thru port 834 and the minimum labeled "×" corresponds to when substantially all the signal exits the interferometer switch through the cross-over port 832.

In the first, second and third embodiments of the optical switch, an X-cut, Z-propagation $LiNbO_3$ crystal was used as the substrate. In addition to not being limited to $LiNbO_3$ as the substrate material, the invention is not intended to be limited to an X-cut crystal orientation. It is contemplated that other orientations will work for the switch substrate. For example, FIG. 10 shows a Y-cut, Z-propagation optically active crystal as the substrate. In FIG. 10, the interferometer switch 1000 has an upper and lower input port, 1002 and 1004, respectively, and an input and an output directional coupler 1006 and 1010, respectively. The input directional coupler 1006, has an upper input electrode 1012 and a lower input electrode 1014. The second directional coupler 1010, has an upper output electrode 1016 and a lower output electrode 1018. In the interferometer section 1008, there is an upper switch electrode 1020, and a lower switch electrode 1022.

In FIG. 10, because the crystal's X and Y axes are rotated about the Z axis by 90° from the X-cut examples, the electrodes 1012, 1014, 1016, 1018, 1020, and 1022 must be placed in different positions relative to the waveguides in order to induce the change in propagation constant, $\Delta\beta$, in the Y-direction. As FIG. 10 illustrates, the electrodes must be placed above the waveguides to induce a $\Delta\beta$ in the Y direction. Also contemplated for the Y-cut crystal is placing some or all of the electrodes under the waveguides.

After a switch made according to the preferred embodiments has been installed, the aforementioned tuning feature of the switch (e.g., the switch 300 shown in FIG. 3A) can be used to optimize the switching function if the switch is degraded by local conditions such as for example, temperature, pressure, mechanical stresses such as bending or twisting, and chemical environment. The switch's tuning characteristics can also be used to optimize the switching function if it degrades over time. For example, switching degradation can be caused by substances diffusing into the switch substrate and waveguides, or by the frequency of the optical signal changing, etc. Virtually any change in the switching characteristics based on altered directional coupler functionality can be compensated by tuning the directional couplers using their associated electrodes.

Figures 11A, 11B:
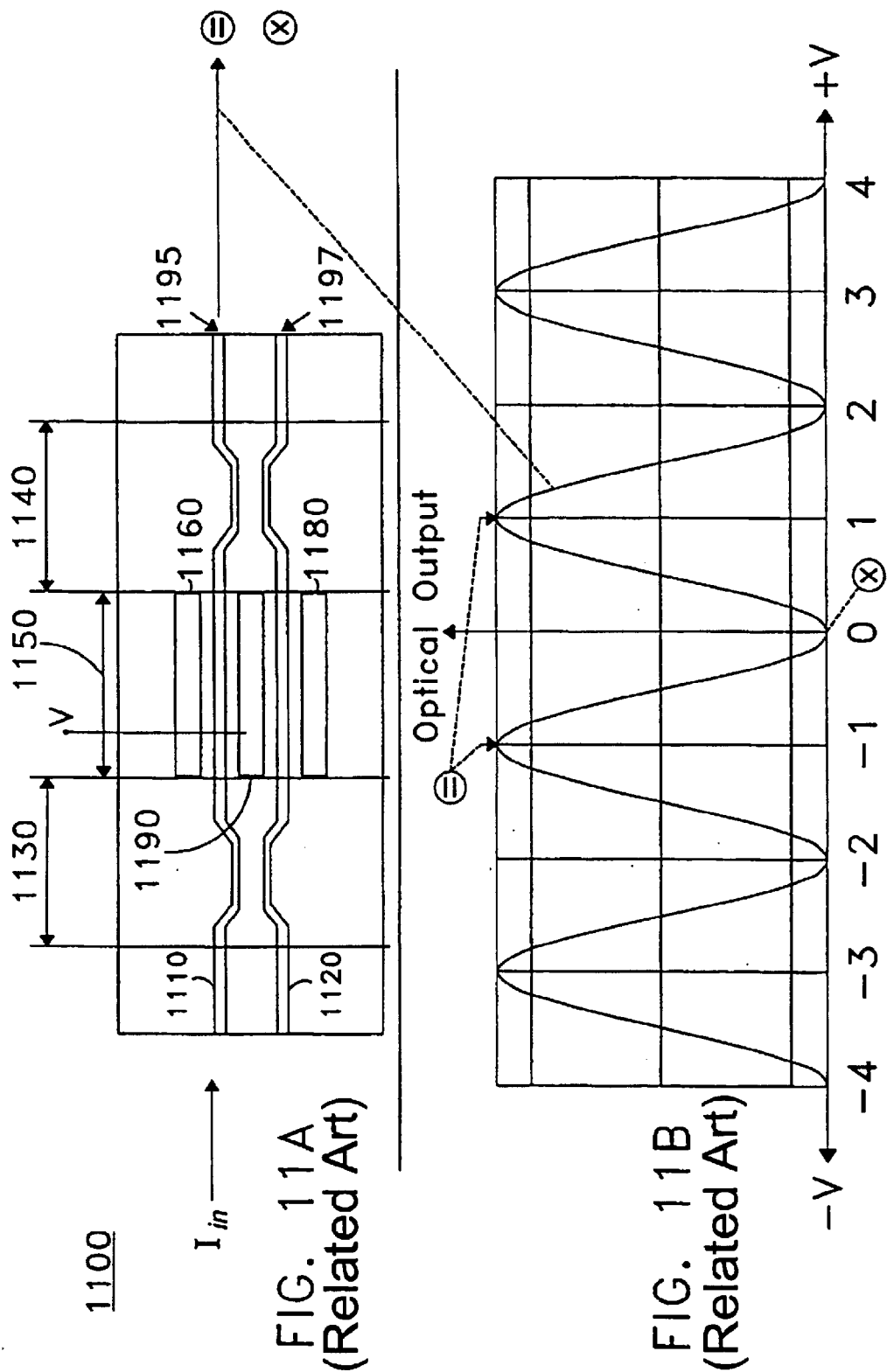
FIGS. 11A and 11B are diagrams correlating the output port of a related art switch with the output signal.

FIG. 11A shows related art balanced-bridge interferometer 1100, with a graph of the signal output of the straight-thru port. 1110 and 1120, are the top and bottom input ports, respectively. 1130 and 1140, are the first and second directional couplers. 1150 is the interferometer section, and includes an upper and lower electrode 1160 and 1180, respectively, which are held at ground potential, and a middle electrode 1190, which receives a controlling signal. 1195 and 1197 are the straight-thru and cross-over outputs, respectively. All the waveguides are single-moded.

For the related art balanced-bridge interferometer switch 1100, to function with low cross-talk, each directional coupler 1130 and 1140, should have an effective length of one-half the characteristic coupling length. In operation, a differential phase shift is induced within the interferometer section 1150, by application of a switching signal to the middle electrode 1190.

The output of the straight-thru port as a function of applied switching voltage for coupler lengths of one-half the characteristic coupling length is shown in FIG. 11B. The maximums of the output labeled "=" correspond to when substantially all the signal exits the interferometer 1100, through the straight-thru port 1195, and the minimum labeled "×" corresponds to when substantially all the signal exits the interferometer through the cross-over port 1197. When the lengths of the first and second directional coupler 1130 and 1140, respectively, are one-half the characteristic coupling length, the interferometer exhibits low cross-talk as indicated by the minima of FIG. 11B being substantially equal to 0.

Figure 12D:
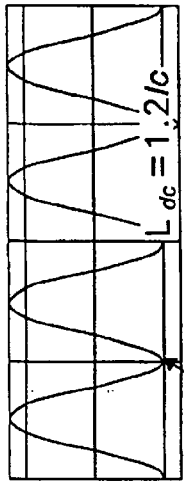
FIGS. 12A-12E shows the output of a related art switch for various coupling lengths of the directional couplers.
Figure 12E:
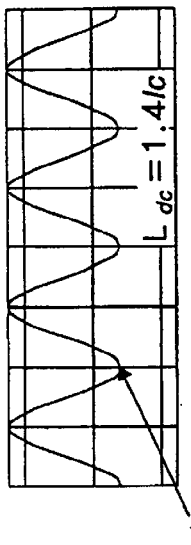
Figure 12A:
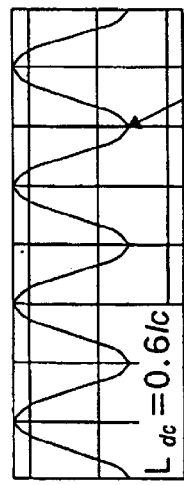
Figure 12B:
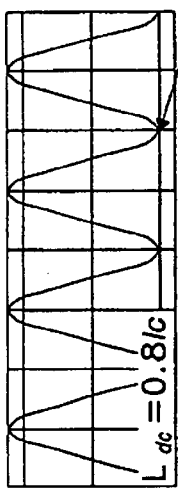
Figure 12C:
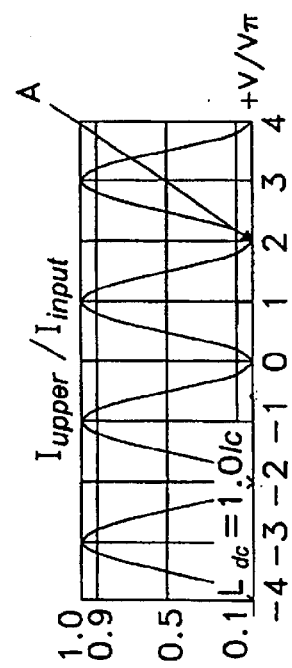
Figure 13A:
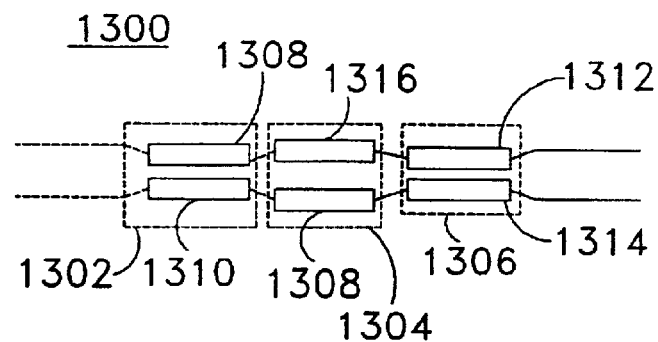
FIGS. 13A-13B show a schematic of the invention with bias-able directional couplers, and contour plot showing the output power for both outputs of a single bias-able directional coupler.

FIGS. 12A through 12E show the output of the straight-thru port 1195, as a ratio between input signal and output through the straight-thru port, of the interferometer switch 1100, for a range of directional coupler 1130 and 1140, lengths from $0.6l_c$ to $1.4l_c$. When the ratio is close to one, substantially all the signal exits through the straight-thru port, and when the ratio is close to 0, substantially all the signal exits through the cross-over port. In FIG. 12C, where the minimum represented by the reference letter "A" is close to 0, the interferometer switch 1100 is exhibiting low cross-talk, and has a minimum of cross-talk when $L_{dc}=1.0l_c$. The interferometer switch 1100 exhibits increasing cross-talk as indicated by the minimum at A increasing in value as $L_{dc}$ deviates from $1.0l_c$. FIGS. 12A, 12B, 12D, and 12E are for $L_{dc}=0.6l_c$, $L_{dc}=0.8l_c$, $L_{dc}=1.2l_c$, $L_{dc}=1.4l_c$ FIG. 13A is an example of a balanced bridge interferometer switch 1300, with an input directional coupler 1302, an interferometer section 1304, and an output directional coupler 1306. The input directional coupler 1302, has a pair of electrodes 1308 and 1310. The output directional coupler 1306, has a pair of electrodes 1312 and 1314. The interferometer section has a pair of electrodes 1316 and 1318. The interaction lengths $L_B$, of the input and output directional couplers, 1302 and 1306, respectively are each equal to one-half the characteristic coupling length $l_c$.

Via the electrodes 1308, 1310, 1312, and 1314, associated with the directional couplers 1302 and 1306, a difference in the propagation constant $\Delta\beta_{dc}$, of the waveguides in the couplers can be induced. A normalized applied voltage of $\Delta\beta_{dc}L_B/\pi=\pm0.8$ is the preferred voltage to be applied between the electrodes 1308 and 1310, as well as between 1312 and 1314. It is further preferred that the each directional coupler be biased the same amount but with an opposite sign, and this would be achieved by suitably controlling the polarity of the bias voltages. By applying a normalized voltage of $\Delta\beta_{dc}L_B/\pi=\pm0.8$, the widest range of coupler interaction length $L_B$ is allowed for a coupler to function as a 3 dB coupler.

Figure 13B:
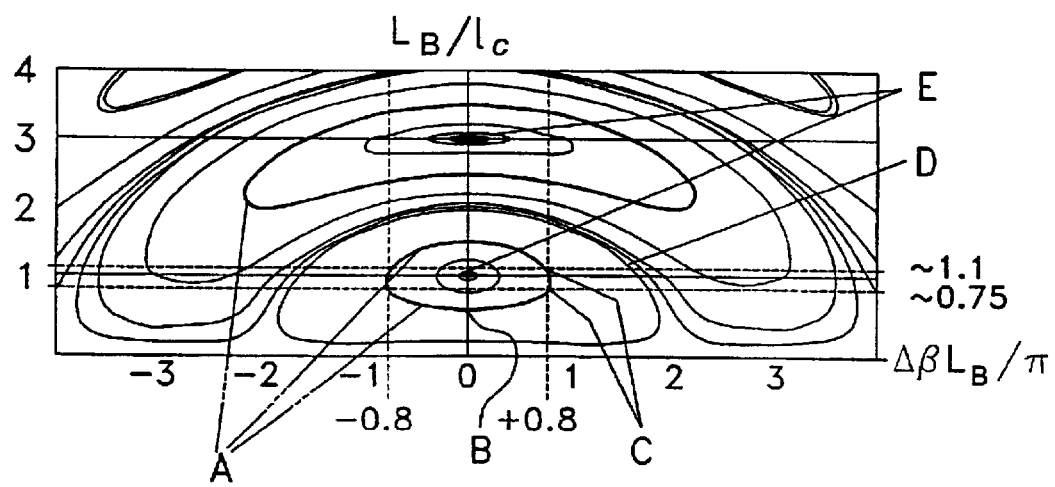

FIG. 13B is a contour plot for a single directional coupler which could be used as either the input directional coupler 1302 or the output directional coupler 1306 of the balanced bridge interferometer switch 1300. The horizontal axis is the induced change in propagation constants between the waveguides of a directional coupler as expressed in units of $\Delta\beta_{dc}L_B/\pi$, where $\Delta\beta_{dc}$ is the difference in the propagation constant between the waveguides and $L_B$ is the interaction length of the coupler. The vertical axis is the normalized interaction length between the couplers as expressed in units of $L_B/l_c$, where $L_B$ is the same as for the horizontal axis and $l_c$ is the characteristic coupling length. Characteristic coupling length is the interaction length between the two waveguides sufficient to transfer all the power in one waveguide into the other. Reference letter "A" indicates the locus of the 3 dB half power points. Reference letter "D" is where the locus of the 3 dB half power point crosses the zero vertical axis. Reference letter "C" is that section of the 3 dB locus corresponding to where $\Delta\beta_{dc}L_B/\pi$ is approximately equal to 0.8. Reference letter "D" indicates the contour for when all of the output power exits from the straight through output with less than 30 dB power exiting through the crossover output. Reference letter "E" indicates the power contour region when all the output power exits through the cross-over output with less than 30 dB power exiting through the straight-thru output.

The line where the normalized applied voltage bias equals zero on the horizontal axis corresponds to the 0 bias state of related art directional couplers. Hence FIG. 13B indicates that, with a normalized applied voltage bias equal to zero, the line associated with the interaction length of a coupler bisects the locus of the 3 dB half power point near 0, and consequently intersects the locus in a region corresponding to a point.

The physical implication of FIG. 13B is that the interaction length of the coupler must be precisely controlled in order to achieve the 3 dB coupler. When the normalized applied voltage bias ($\Delta\beta_{dc}L_B/\pi$) equals either negative 0.8 or positive 0.8, the edge of the locus of the 3 dB point is intersected. Consequently, the coupler interaction length can have a much greater variation, and 3 dB coupling would still being achieved. Corresponding to ±0.8 normalized voltage bias, the 3 dB coupling length of the coupler ranges from 0.75 to 1.1 in units of $l_c$. In other words, at the bias point of $\Delta\beta_{dc}L_B/\pi\sim\pm0.8$, 3 dB splitting can be achieved for an extended range of $L_B/l_c\sim0.75$ to 1.1 (i.e. $L_{dc}/l_c\sim1.5$ to 2.2), not a singular point as in the conventional design.

The 3 dB locus in the regions of $\Delta\beta_{dc}L_B/\pi=+0.8$ and $-0.8$ normalized voltage bias has an opposite curvature. The bias of the input and output directional couplers for the balanced bridge interferometer switch are chosen to have the same magnitude, but opposite polarity to balance out this slight asymmetry.

The contour plot of FIG. 13B is derived using standard coupled wave formula. The derivation and starting equations can be found, for example, in the "Handbook of Microwave and Optical Components," Vol. 4, Chapter 4, "Optical Modulation, Electro-Optic devices," by Suwat Thaniyavarn, which is incorporated herein by reference.

FIGS. 14A through 14H show the output of the switch 300 shown in FIG. 3A for various coupling lengths ranging from $1.2l_c$ to $2.6l_c$. When the ratio shown in FIGS. 14A through 14H is close to one, substantially all the signal exits through the straight-thru port, and when the ratio is close to 0, substantially all the signal exits through the cross-over port. In FIGS. 14B through 14G, which corresponds to $L_{dc}=1.4l_c$ to $2.4l_c$, reference letter "A" indicates that there is substantially 0 cross talk. This is a much wider operational range than the related art interferometer switch represented by FIGS. 12A through 12E.

Figure 15:
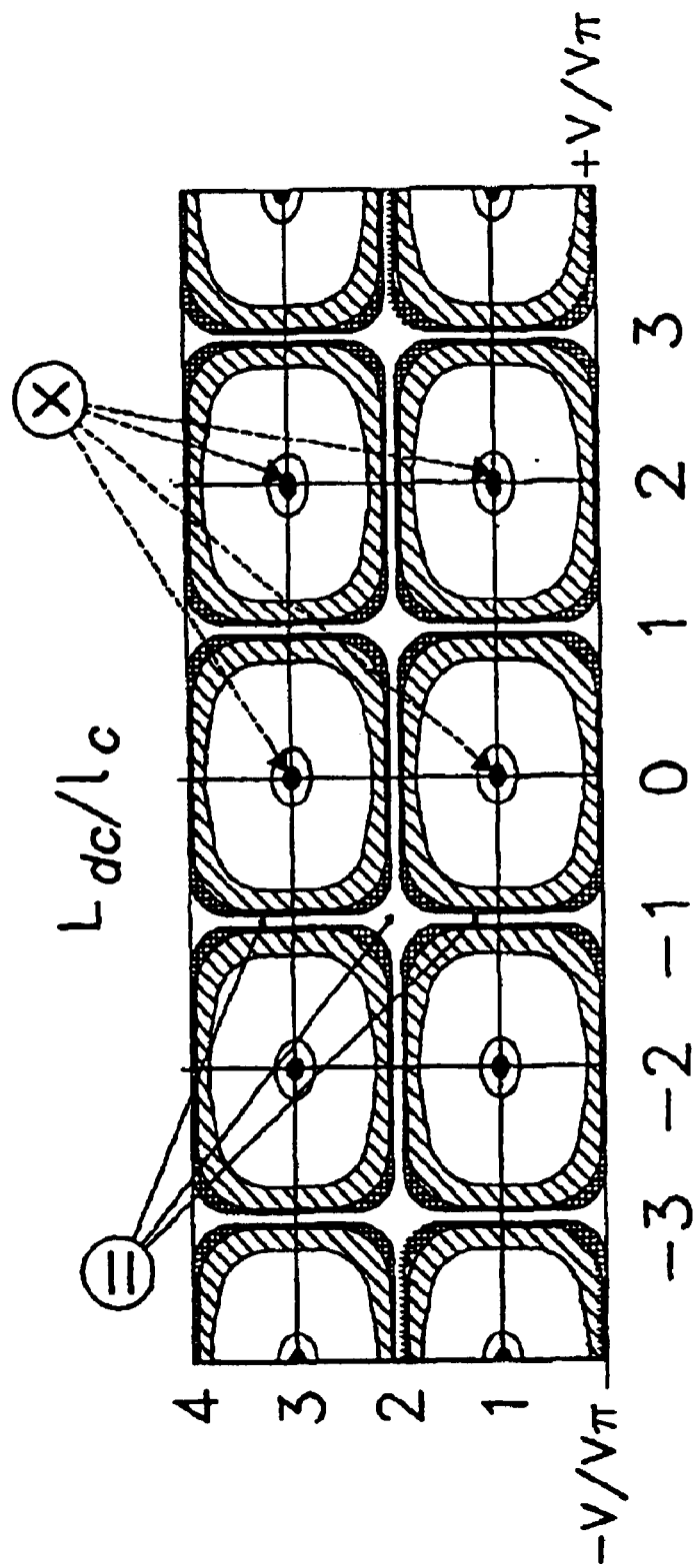

FIG. 15 shows contour plots of straight-thru and cross-over switch states for a related art balanced bridge interferometer. The "×" corresponds to the cross-over switch state with three levels of cross-talk of <−30 dB, <−20 dB, and <−10 dB. The "=" corresponds to straight-thru switch states with three levels of cross-talk of <−30 dB, <−20 dB, and <−10 dB.

As described above, the present invention provides various advantages. According to the preferred embodiments, polarization independent switching over a broad wavelength can be realized because of relaxed coupler length tolerances. Further, the polarization independent switching has a very low polarization mode dispersion (PMD) and polarization dependent loss (PDL) through the use of Z-axis (i.e., optic-axis) propagation waveguide orientation on an electro-optic substrate where TE and TM see an identical ordinary index.

A low crosstalk switch (less than −25 dB) can be achieved for a very large range of $L_{dc}$ values (first preferred embodiment $1.5l_c$ to $2.2l_c$). In accordance with the large range of the directional coupler effective coupling length $L_{dc}$, a fabrication tolerance of $L_{dc}$ equal to $1.5l_c$ to $2.2l_c$ can be achieved, which creates an increased production yield. Further, since the characteristic coupling length $l_c$ of the directional coupler is a function of an optical wavelength and polarization (and to a small degree a function of environmental parameters such as waveguide loading effects from a dielectric layer, electrode layer, stress, temperature, etc.), the switch can be designed to operate in a very broad range of wavelengths for both TE and TM polarizations.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A device, comprising:
    at least one optical input;
    a first coupler optically coupled to said optical input;
    an optical interferometer optically coupled to said first coupler and having a first optical path and a second optical path, said interferometer having an input that receives a signal voltage, wherein an optical path length difference between said first and second optical paths is induced in response to the signal voltage;
    a second coupler optically coupled to said optical interferometer; and
    at least one optical output optically coupled to said second coupler;
    wherein a dimension of the first coupler and a dimension of the second coupler are adapted to produce first and second optical propagation constant $\Delta\beta$ mismatches, respectively, wherein the first and second optical propagation constant $\Delta\beta$ mismatches are different.

2. The device of claim 1, comprising at least two optical inputs, wherein both optical inputs are coupled to said first coupler.

3. The device of claim 1, comprising at least two optical outputs, wherein both optical outputs are coupled to said second coupler.

4. The device of claim 1, wherein said first and second optical propagation constant $\Delta\beta$ mismatches are approximately equal in magnitude and opposite in sign.

5. The device of claim 1, wherein the first and second optical propagation constant $\Delta\beta$ mismatches enable the device to operate over a broader bandwidth than without the first and second optical propagation constant $\Delta\beta$ mismatches.

6. The device of claim 1, comprising an electro-optic material.

7. The device of claim 6, wherein said electro-optic material is oriented to provide a first propagation constant to a transverse electric field mode TE and a second propagation constant to transverse magnetic field mode TM of an optical signal, where a first propagation constant and a second propagation constant have substantially equal magnitudes.

8. The device of claim 6, where the electro-optic material comprises lithium niobate.

9. The device of claim 8, where the said lithium niobate has an X-axis, a Y-axis, and a Z-axis, and said lithium niobate is cut along an X-axis, and a signal propagates along a Z-axis.

10. The device of claim 9, where the said lithium niobate is cut along a Y-axis and a signal propagates along a Z-axis.

11. The device of claim 1, wherein said first coupler comprises a first directional coupler waveguide originating at a first optical input and a second directional coupler waveguide originating at a second optical input;
    said second coupler comprises a second pair of directional coupler waveguides optically coupled to a pair of outputs; and
    said first and second optical paths comprise a pair of interferometer waveguides optically coupled to corresponding ones of said first pair of directional coupler waveguides and said second pair of coupler waveguides.

12. The device of claim 11, wherein said first and second pair of directional coupler waveguides comprise electro-optic material and have a first and a second coupler voltage input, respectively, whereby a first and a second coupler voltage can be applied to said first and second couplers to effectively induce the first and second optical propagation constant $\Delta\beta$ mismatches, respectively.

13. The device of claim 12, wherein said first and second voltages have approximately equal magnitudes and opposite signs.

14. The device of claim 1, wherein said first coupler has at least one first coupler electrode that receives a first coupler voltage and said second coupler has at least one second coupler electrode that receives a second coupler voltage.

15. The device of claim 1, wherein said interferometer comprises multiple waveguides.

16. The device of claim 15, wherein said waveguides comprise electro-optic material.

17. The device of claim 1, wherein said interferometer comprises at least one interferometer electrode that receives a signal voltage.

18. The device of claim 11, wherein said first pair of coupler waveguides have different transverse or depth dimensions and said second pair of coupler waveguides have different transverse or depth dimensions.

19. The device of claim 18, wherein the different transverse or depth dimensions of said first pair of directional coupler waveguides produces the first optical propagation constant $\Delta\beta$ mismatch and the different transverse or depth dimensions of said second pair of directional coupler waveguides produces the second optical propagation constant $\Delta\beta$ mismatch, and said first and second optical propagation constant $\Delta\beta$ mismatches have approximately equal magnitudes and are opposite in sign.

20. The device of claim 1, wherein said first coupler comprises an at least first dopant and said second coupler comprises an at least second dopant.

21. The device of claim 11, wherein said first coupler comprises an at least first dopant and said second coupler comprises an at least second dopant, and said at least first dopant provides a first optical propagation constant $\Delta\beta$ mismatch between said first pair of directional coupler waveguides, and said at least second dopant provides a second optical propagation constant $\Delta\beta$ mismatch between said second pair of directional coupler waveguides.

22. The device of claim 20, wherein first optical propagation constant $\Delta\beta$ mismatch and second optical propagation constant $\Delta\beta$ mismatch are approximately equal in magnitude and opposite in sign.

23. The device of claim 20, wherein said at least first dopant and said at least second dopant are substantially the same material.

24. The device of claim 20, wherein said first coupler comprises multiple dopants and said second coupler comprises multiple dopants.

25. A device, comprising:
at least one optical input;
an input directional coupler optically coupled to said at least one optical input having a first optical propagation constant $\Delta\beta$ mismatch;
a first optical waveguide optically coupled to said input directional coupler and having a first optical path length;
a second optical waveguide optically coupled to said input directional coupler and having a second optical path length;
a control signal electrically coupled to at least one of said first and second optical waveguides, whereby an optical path length difference between said first and second optical paths is controllable variable in response to the control signal; and
an output directional coupler optically coupled to said first and second optical waveguides and capable of having a second optical propagation constant $\Delta\beta$ mismatch;
wherein dimensions of the input and output directional couplers or dopants in the input and output directional couplers are adapted so that the first and second optical propagation constant $\Delta\beta$ mismatches are different.

26. The device of claim 25, wherein said first and second optical propagation constant $\Delta\beta$ mismatches are approximately equal in magnitude.

27. The device of claim 25, wherein the magnitude of the first and second optical propagation constant $\Delta\beta$ mismatches are controllably variable.

28. The device of claim 25, further comprising means for controllably varying the magnitude and sign of the first optical propagation constant $\Delta\beta$ mismatch with a first input voltage, and means for controllably varying the magnitude and sign of the second optical propagation constant $\Delta\beta$ mismatch with a second input voltage.

29. The device of claim 25, wherein said input directional coupler has a first variable effective coupling length, and said output directional coupler has a second variable effective coupling length.

30. The device of claim 29, further comprising means for controllably varying said first variable effective coupling length with a first bias voltage, and means for controllably varying said second variable effective coupling length with a second bias voltage.

31. The device of claim 25, wherein said first directional coupler and said second directional coupler comprise at least one dopant.

32. The device of claim 25, wherein said first directional coupler and said second directional coupler comprise waveguides of dissimilar dimensions.

33. The device of claim 25, wherein said first and second optical waveguides comprise an electro-optic material.

34. The device of claim 25, wherein said first and second optical waveguides form an interferometer.

35. A balanced bridge optical switch, comprising:
at least one input port;
an input directional coupler having a first optical propagation constant $\Delta\beta$ mismatch coupled to said at least one input port;
an interferometer optically coupled to said input directional coupler;
an output directional coupler having a second optical propagation constant $\Delta\beta$ mismatch optically coupled to said interferometer;
at least one output port optically coupled to said output directional coupler;
whereby a first optical propagation constant $\Delta\beta$ mismatch is adjusted to provide an approximate 50% power split at said input directional coupler for a range of effective coupling lengths from approximately $0.75l_c$ to approximately $1.1l_c$, and a second optical propagation constant $\Delta\beta$ mismatch is adjusted to provide an approximate 50% power split at said output directional coupler for a range of effective coupling lengths from approximately $0.75l_c$ to approximately $1.1l_c$;
wherein dimensions of the input and output directional couplers or dopants in the input and output directional couplers are adapted so that the first and second optical propagation constant $\Delta\beta$ mismatches are different.

36. The balanced bridge optical switch of claim 35, where a first electric field provides a first optical propagation constant $\Delta\beta$ mismatch, and a second electric field provides a second optical propagation constant $\Delta\beta$ mismatch.

37. The balanced bridge optical switch of claim 35, where dissimilar waveguide dimensions in the input directional coupler provide a first optical propagation constant $\Delta\beta$ mismatch, and dissimilar waveguide dimensions in the output directional coupler dimensions provide a second optical propagation constant $\Delta\beta$ mismatch.

38. The balanced bridge optical switch of claim 35, where dopants provide a first optical propagation constant $\Delta\beta$ mismatch, and dopants provide a second optical propagation constant $\Delta\beta$ mismatch.

39. The balanced bridge optical switch of claim 35, where the effective coupling length of said input directional coupler combined with the effective coupling length of said output directional coupler has a range from approximately $1.5l_c$ to approximately $2.2l_c$.

40. The balanced bridge optical switch of claim 35, where the effective coupling length of said input directional coupler is substantially equal to the effective coupling length of said output directional coupler.

41. The balanced bridge optical switch of claim 35, where the magnitude of a first optical propagation constant $\Delta\beta$ mismatch is such that $\Delta\beta L_{dc}/\pi$ is approximately plus or minus 1.6, and the magnitude of a second optical propagation constant $\Delta\beta$ mismatch is such that $\Delta\beta L_{dc}/\pi$ is approximately plus or minus 1.6, where $L_{dc}$ is the interaction lengths of the directional coupler.

42. The balanced bridge optical switch of claim 35, where the magnitude of a first optical propagation constant $\Delta\beta$ mismatch is such that $\Delta\beta L_{dc}/\pi$ is approximately plus or minus 1.6, and the magnitude of a second optical propagation constant $\Delta\beta$ mismatch is such that $\Delta\beta L_{dc}/\pi$ is approximately plus or minus 1.6, where $L_{dc}$ is the interaction lengths of the directional coupler, and the effective coupling length of said input directional coupler combined with the effective coupling length of said output directional coupler has a range from approximately $1.5l_c$, to approximately $2.2l_c$.

43. A balanced bridge optical switch, comprising:
at least one input port;
an input directional coupler having a first optical propagation constant $\Delta\beta$ mismatch coupled to said at least one input port;
an interferometer optically coupled to said input directional coupler;
an output directional coupler having a second optical propagation constant $\Delta\beta$ mismatch optically coupled to said interferometer;
at least two output ports optically coupled to said output directional coupler;
whereby the effective coupling length of said input directional coupler combined with the effective coupling length of said output directional coupler has a range from approximately $1.5l_c$ to approximately $2.2l_c$, and a first optical propagation constant $\Delta\beta$ mismatch is determined and a second optical propagation constant $\Delta\beta$ mismatch is determined such that crosstalk between said at least two output ports is below a desired amount;
wherein dimensions of the input and output directional couplers or dopants in the input and output directional couplers are adapted so that the first and second optical propagation constant $\Delta\beta$ mismatches are different.

44. The balanced bridge optical switch of claim 43, whereby the desired amount is less than −15 dB.

45. The balanced bridge optical switch of claim 43, whereby the desired amount is less than −20 dB.

46. The balanced bridge optical switch of claim 43, whereby the desired amount is less than −25 dB.

47. The balanced bridge optical switch of claim 43, where the magnitude of a first optical propagation constant $\Delta\beta$ mismatch is such that $\Delta\beta L_{dc}/\pi$ is approximately plus or minus 1.6, and the magnitude of a second optical propagation constant $\Delta\beta$ mismatch is such that $\Delta\beta L_{dc}/\pi$ is approximately plus or minus 1.6, where $L_{dc}$ is the interaction lengths of the directional coupler, and the interaction length of said input directional coupler and the interaction length of said output directional coupler are selected to provide less than a predetermined amount of crosstalk between said at least two output ports.

48. The balanced bridge optical switch of claim 47, whereby the predetermined amount is less than −15 dB.

49. The balanced bridge optical switch of claim 47, whereby the predetermined amount is less than −20 dB.

50. The balanced bridge optical switch of claim 47, whereby the predetermined amount is less than −25 dB.

51. The device of claim 1, wherein the first optical propagation $\Delta\beta$ mismatch, and the second optical propagation $\Delta\beta$ mismatch operate over a range of wavelengths from at least approximately 1530 nm to at least approximately 1610 nm.

52. The device of claim 25, wherein the first optical propagation $\Delta\beta$ mismatch, and the second optical propagation $\Delta\beta$ mismatch operate over a range of wavelengths from at least approximately 1530 nm to at least approximately 1610 nm.

53. The device of claim 35, wherein the first optical propagation $\Delta\beta$ mismatch, and the second optical propagation $\Delta\beta$ mismatch operate over a range of wavelengths from at least approximately 1530 nm to at least approximately 1610 nm.

54. The device of claim 43, wherein the first optical propagation $\Delta\beta$ mismatch, and the second optical propagation $\Delta\beta$ mismatch operate over a range of wavelengths from at least approximately 1530 nm to at least approximately 1610 nm.

55. The device of claim 26, wherein said first and second optical propagation constant $\Delta\beta$ mismatches are opposite in sign.

56. The device of claim 1, wherein the first optical propagation $\Delta\beta$ mismatch, and the second mismatch optical propagation $\Delta\beta$ mismatch operate over the L band and at least a portion of the C band.

57. The device of claim 1, wherein the first optical propagation $\Delta\beta$ mismatch, and the second mismatch optical propagation $\Delta\beta$ mismatch operate over the C band and at least a portion of the L band.

58. The device of claim 25, wherein said first coupler and said second coupler are configured to have a first and a second optical propagation constant $\Delta\beta$ mismatch that enables the device to operate over a broader bandwidth than without said first and second optical propagation constant $\Delta\beta$ mismatch.

59. The balanced bridge optical switch of claim 35, wherein said first coupler and said second coupler are configured to have a first and a second optical propagation constant $\Delta\beta$ mismatch that enables the device to operate over a broader bandwidth than without said first and second optical propagation constant $\Delta\beta$ mismatch.

60. A method of creating an optical switch on a substrate, comprising:
arranging on the substrate an input optical coupler having at least a first input, and a first and a second output, said optical coupler capable of producing a first optical propagation constant $\Delta\beta$ mismatch;
arranging on the substrate an output optical coupler having a first and a second input, and a first and a second output, said optical coupler capable of producing a second optical propagation constant $\Delta\beta$ mismatch;
coupling said first output of said input coupler to said first input of said output optical coupler via a first optical path;
coupling said second output of said input optical coupler to said second input of said output optical coupler via a second optical path; and
inducing an optical path length difference between said first optical path and said second optical path;

wherein dimensions of the input and output optical couplers or dopants in the input and output couplers are adapted so that the first and second optical propagation constant $\Delta\beta$ mismatches are different.

61. The method of claim 60, further comprising inputting an input optical signal into said at least first input of said input optical coupler, and dividing said input optical signal into an optical signal within said first optical path and an optical signal within said second optical path.

62. The method of claim 60, wherein inducing an optical path length difference between said first optical path and said second optical path comprises forming at least one electric field.

63. The method of claim 60, wherein inducing an optical path length difference inducer between said first optical path and said second optical path comprises forming a first electric field within said first optical path and forming a second electric field within said second optical path.

64. The method of claim 60, wherein producing said first optical propagation constant $\Delta\beta$ mismatch in said input optical coupler comprises creating a first electric field within a first region of said input optical coupler and creating a second electric field within a second region of said input optical coupler; and producing said second optical propagation constant $\Delta\beta$ mismatch in said output optical coupler comprises creating a first electric field within a first region of said output optical couplet and creating a second electric field within a second region of said output optical coupler.

65. The method of claim 60, wherein producing a first optical propagation constant $\Delta\beta$ mismatch in said input optical coupler comprises doping said first optical coupler, and producing a second optical propagation constant $\Delta\beta$ mismatch in said output optical coupler comprises doping said output optical coupler.

66. The method of claim 60, wherein producing said first optical propagation constant $\Delta\beta$ mismatch in said input optical coupler comprises creating a first input coupler waveguide of a first dimension, and creating a second input coupler waveguide of a second dimension; and producing said second optical propagation constant $\Delta\beta$ mismatch in said output optical coupler comprises creating a first output coupler waveguide of a first dimension, and creating a second output coupler waveguide of a second dimension.

67. A method of switching an optical signal between a first optical waveguide and a second optical waveguide, comprising:

dividing an input optical signal into a first optical signal and a second optical signal by inputting said optical signal into an input optical coupler comprising a first $\Delta\beta$ mismatch;

inputting said first optical signal into a first optical path, and inputting said second optical signal into a second optical path;

combining said first optical signal and said second optical signal to form an output signal by inputting said first and second optical signals into an output optical coupler comprising a second $\Delta\beta$ mismatch;

varying an optical path length of said first optical path relative to said second optical path; and wherein dimensions of the input and output optical couplers or dopants in the input and output optical couplers are adapted so that the first and second $\Delta\beta$ mismatches are different.

68. The method of switching an optical signal of claim 67, wherein the first and second $\Delta\beta$ mismatches are approximately equal in magnitude and opposite in sign.

69. The method of claim 67, wherein varying an optical path length of said first optical path relative to said second optical path comprises forming an electric field within at least said first optical path.

70. A method of manipulating an optical signal, comprising:

inputting the optical signal into an input optical coupler with a first optical propagation $\Delta\beta$ mismatch and outputting resulting first and second optical signals;

delaying one of said resulting first and second optical signals with respect to the other of said resulting first and second optical signals; and combining the resulting first and second optical signals in an output optical coupler with a second optical propagation $\Delta\beta$ mismatch;

wherein dimensions of the input and output optical couplers or dopants in the input and output optical couplers are adapted so that the first and second $\Delta\beta$ mismatches are different.

71. The method of claim 70, wherein the first optical propagation $\Delta\beta$ mismatch is produced by applying a first electric field to said input optical coupler, and said second optical propagation $\Delta\beta$ mismatch is produced by applying a second electric field to said output optical coupler.

72. The method of claim 70, wherein the first optical propagation $\Delta\beta$ mismatch is produced by doping at least one optical path within said input optical coupler, and said second optical propagation $\Delta\beta$ mismatch is produced by doping at least one optical path within said output optical coupler.

73. The method of claim 70, wherein the first optical propagation $\Delta\beta$ mismatch is produced by different transverse dimensions of a first optical path relative to a second optical path within said input optical coupler, and said second optical propagation $\Delta\beta$ mismatch is produced by different transverse dimensions of a first optical path relative to a second optical path within said output optical coupler.

74. The method of claim 70, wherein delaying one of said first and second optical signals with respect to the other of said first and second optical signals comprises passing at least one of said first and second optical signals through a controllable electric field.

75. A method of manipulating an optical signal, comprising inputting the optical signal into an input optical coupler with a first optical propagation $\Delta\beta$ mismatch and outputting resulting first and second optical signals;

coupling said resulting first and second optical signals into first and second optical paths, respectively, whereby said first and second optical paths have a controllable optical path length difference; and combining the resulting first and second optical signals in an output optical coupler with a second optical propagation $\Delta\beta$ mismatch;

wherein dimensions of the input and output optical couplers or dopants in the input and output optical couplers are adapted so that the first and second $\Delta\beta$ mismatches are different.

76. The method of claim 75, wherein the first optical propagation $\Delta\beta$ mismatch is produced by applying a first electric field to said input optical coupler, and said second optical propagation $\Delta\beta$ mismatch is produced by applying a second electric field to said output optical coupler.

77. A method of manipulating an optical signal, comprising:
- inputting the optical signal into an input optical coupler with a first optical propagation Δβ mismatch and outputting resulting first and second optical signals;
- varying the phase angle of one of said resulting first and second optical signals with respect to the phase angle of the other of said resulting first and second optical signals; and
- combining the resulting first and second optical signals in an output optical coupler with a second optical propagation Δβ mismatch;
- wherein dimensions of the input and output optical couplers or dopants in the input and output optical couplers are adapted so that the first and second Δβ mismatches are different.

78. A method of manipulating an optical signal, comprising:
- inputting the optical signal into an input optical coupler with a first optical propagation Δβ mismatch and outputting resulting first and second optical signals;
- coupling said resulting first and second optical signals into first and second optical paths, respectively, whereby said first and second optical paths cause a phase angle difference between said resulting first and second optical signals; and
- combining the resulting first and second optical signals in an output optical coupler with a second optical propagation Δβ mismatch;
- wherein dimensions of the input and output optical couplers or dopants in the input and output optical couplers are adapted so that the first and second Δβ mismatches are different.

79. A device, comprising:
- at least one optical input;
- a first coupler optically coupled to said optical input having a first optical propagation constant Δβ mismatch and comprising multiple dopants;
- an optical interferometer optically coupled to said first coupler and having a first optical path and a second optical path, said interferometer having an input that receives a signal voltage, wherein an optical path length difference between said first and second optical paths is induced in response to the signal voltage;
- a second coupler optically coupled to said optical interferometer and capable of having a second optical propagation constant Δβ mismatch and comprising multiple dopants.

* * * * *